United States Patent
Trivett et al.

(10) Patent No.: US 11,837,453 B2
(45) Date of Patent: Dec. 5, 2023

(54) NEBULISER OUTLET

(71) Applicant: Micromass UK Limited, Wilmslow (GB)

(72) Inventors: Ian David Trivett, Cheadle (GB); Anthony Hesse, Stockport (GB); Mark Walford, Wilmslow (GB); Daniel J. Kenny, Knutsford (GB); David Gordon, Middlewich (GB); Stanislaw Koziol, Wrentham, MA (US); Steve D. Trudeau, Webster, MA (US); Alastair M. Booth, Glossop (GB); Stephen Ayrton, Bradford (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 17/355,779

(22) Filed: Jun. 23, 2021

(65) Prior Publication Data

US 2021/0398789 A1    Dec. 23, 2021

Related U.S. Application Data

(60) Provisional application No. 63/042,964, filed on Jun. 23, 2020.

(30) Foreign Application Priority Data

Mar. 8, 2021 (GB) .................................. 2103194
Apr. 21, 2021 (GB) .................................. 2105683

(51) Int. Cl.
*H01J 49/04* (2006.01)
*H01J 49/16* (2006.01)
*B33Y 80/00* (2015.01)

(52) U.S. Cl.
CPC .......... *H01J 49/045* (2013.01); *H01J 49/167* (2013.01); *B33Y 80/00* (2014.12)

(58) Field of Classification Search
CPC ........ H01J 49/045; H01J 49/167; B33Y 80/00
See application file for complete search history.

(56) References Cited

U.S. PATENT DOCUMENTS 5,810,252 A    9/1998  Pennamen et al.
5,868,322 A *  2/1999  Loucks, Jr. ............. B05B 7/066
                                                 73/864.81

(Continued)

FOREIGN PATENT DOCUMENTS

CN    208407381 U    1/2019
EP    0265617 A2    5/1988

(Continued)

OTHER PUBLICATIONS

"Comprise." Merriam-Webster.com Dictionary, Merriam-Webster, https://www.merriam-webster.com/dictionary/comprise. Accessed Apr. 4, 2022. (Year: 2022).*

(Continued)

*Primary Examiner* — David A Vanore
(74) *Attorney, Agent, or Firm* — Goodwin Procter LLP

(57) ABSTRACT

A nebuliser outlet comprises an inlet end and an outlet end, a first channel and one or more second channels arranged between the inlet end and the outlet end. The first channel is configured to receive a capillary, and the one or more second channels are configured to pass gas to the outlet end. The nebuliser outlet is a single integrated component.

19 Claims, 17 Drawing Sheets

(56) References Cited

U.S. PATENT DOCUMENTS

| | | | |
|---|---|---|---|
| 7,960,711 B1 | 6/2011 | Sheehan et al. | |
| 9,673,032 B1 * | 6/2017 | Schleifer | H01J 49/045 |
| 2003/0111599 A1 | 6/2003 | Staats | |
| 2007/0257190 A1 | 11/2007 | Li | |
| 2011/0147576 A1 * | 6/2011 | Wouters | H01J 49/167 250/288 |
| 2017/0176386 A1 | 6/2017 | Gentalen | |
| 2017/0304851 A1 | 10/2017 | Paal | |

FOREIGN PATENT DOCUMENTS

| | | |
|---|---|---|
| EP | 0878021 A1 | 11/1998 |
| EP | 2011137 A2 | 1/2009 |
| EP | 2960798 A1 | 12/2011 |
| EP | 2512638 A1 | 10/2012 |
| GB | 2471520 A | 1/2011 |
| GB | 2520389 A | 5/2015 |
| GB | 2549389 A | 10/2017 |
| WO | 2015040384 A1 | 3/2015 |
| WO | 2019116016 A1 | 6/2019 |
| WO | 2019219748 A1 | 11/2019 |
| WO | 2022145118 A1 | 7/2022 |

OTHER PUBLICATIONS

Search Report under Section 17(5) for Application No. GB2105683.3, dated Oct. 29, 2021, 3 pages.

Aramendia, I., et al., "Experimental Evaluation of Perfluorocarbon Aerosol Generation with Two Novel Nebulizer Prototypes", Pharmaceutics 11(1):1-13 (2019).

Search Report under Section 17(5) for Application No. GB2105676.7, dated Jan. 19, 2022, 5 pages.

Garcia-Montoto, V., et al., "3D-printed total consumption microflow nebuliser development for trace element analysis in organic matrices via inductively coupled plasma mass spectrometry", Journal of Analytical Atomic Spectrometry 35 (8):1552-1557 (2020).

International Search Report and Written Opinion for International application No. PCT/GB2021/051592, dated Oct. 12, 2021, 16 pages.

Invitation to Pay Additional Fees And, Where Applicable, Protest Fees for International Patent Application No. PCT/GB2022/051008, mailed Jul. 5, 2022.

\* cited by examiner

Fig. 12
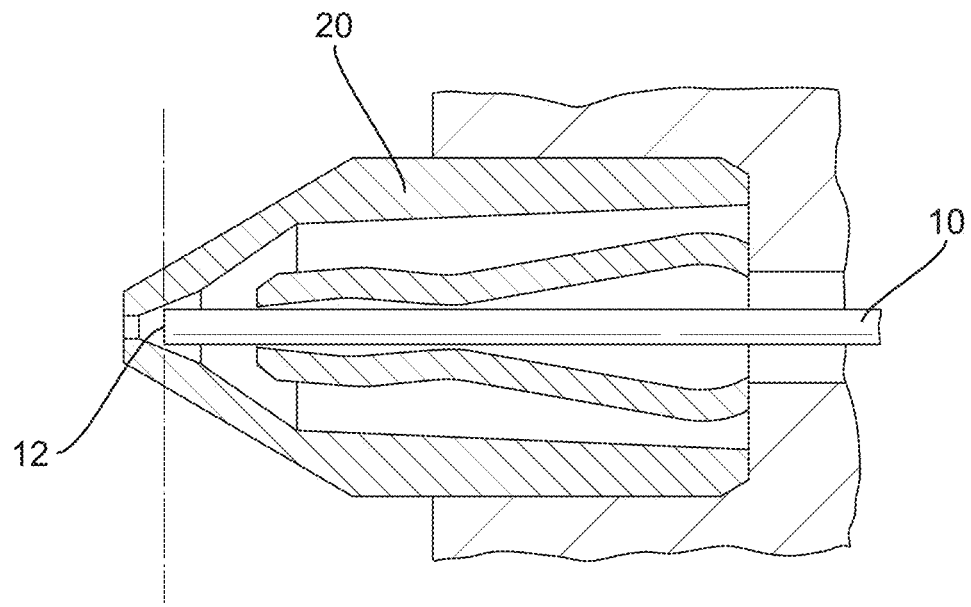
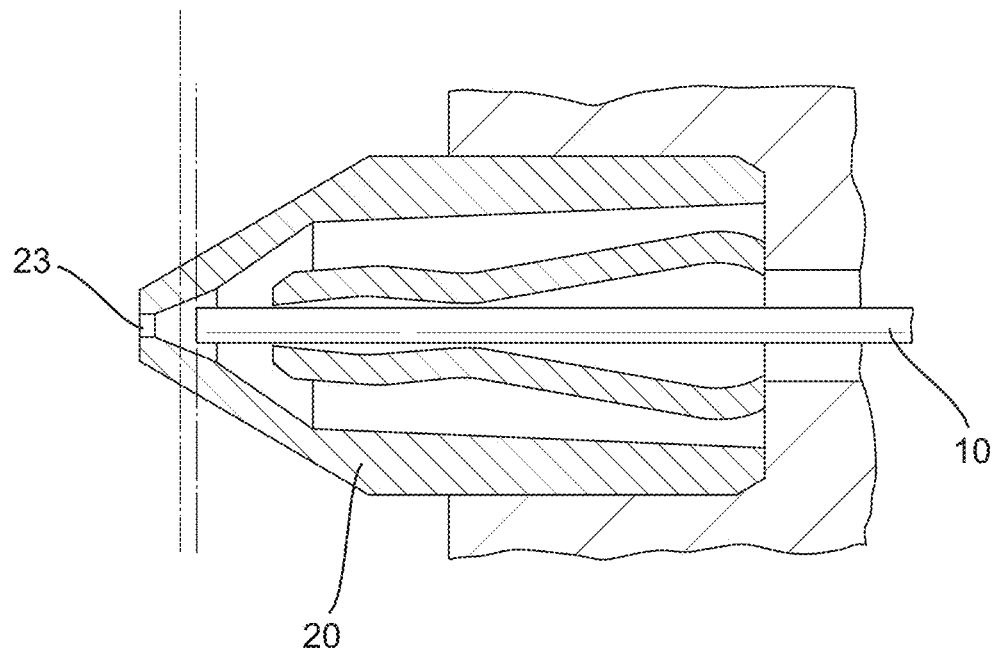

NEBULISER OUTLET

CROSS-REFERENCE TO RELATED APPLICATION

This application claims priority from and the benefit of U.S. Patent Application No. 63/042,964, filed on Jun. 23, 2020, United Kingdom Patent Application No. 2103194.3 filed, on Mar. 8, 2021, and United Kingdom Patent Application No. 2105683.3, filed on Apr. 21, 2021. The entire content of these applications are incorporated herein by reference.

FIELD OF THE INVENTION

The present invention relates generally to ion sources and in particular to nebulisers for ion sources.

BACKGROUND

Ionisation techniques such as Electrospray Ionisation (ESI) utilise a nebuliser to generate a spray of droplets.

Such nebulisers typically comprise a liquid capillary and a gas capillary. The liquid capillary is typically arranged coaxially within the gas capillary, with the liquid-emitting outlet of the liquid capillary extending beyond the distal end of the gas capillary. A flow of liquid supplied to the liquid capillary is nebulised by a nebulising gas flow supplied to the gas capillary.

The Applicants believes that there remains scope for improvements to nebulisers.

SUMMARY

According to an aspect, there is provided a nebuliser outlet comprising:
an inlet end and an outlet end; and
a first channel and one or more second channels arranged between the inlet end and the outlet end;
wherein the nebuliser outlet is configured such that gas can pass to the outlet end via the one or more second channels; and
wherein the nebuliser outlet comprises (is) a single integrated component.

The first channel may be configured to receive a capillary.

Various embodiments are directed to a nebuliser outlet (a nebuliser outlet tip) having an inlet end and an outlet end. A first channel and one or more second channels are arranged between the inlet end and the outlet end. The nebuliser outlet may be configured such that, when a capillary is received by the first channel, gas received by the nebuliser outlet will pass to the outlet end via the one or more second channels, and will nebulise liquid emitted from the capillary.

As will be described in more detail below, embodiments provide a nebuliser outlet in which spatial parameters of the nebuliser outlet, in particular those parameters which affect the interaction between the liquid emitted by the capillary and the nebulising gas, can be precisely controlled and/or substantially fixed. In addition, forming the nebuliser outlet as a single integrated component can significantly reduce manufacturing imperfections in these parameters. The overall effect of this is to significantly reduce variation in the performance of the nebuliser, for example from one use to the next (for example after uninstalling and re-installing a liquid capillary), and from one nebuliser to the next.

Various embodiments accordingly provide an improved nebuliser outlet.

The nebuliser outlet may be formed using an additive manufacturing process. The use of additive manufacturing can significantly reduce manufacturing imperfections in the part, and also facilitates the creation of nebuliser outlet geometries that would be impractical (or even impossible) to form using conventional subtractive machining processes.

The nebuliser outlet may be formed using Selective Laser Melting (SLM).

The nebuliser outlet may be formed using electron-beam additive manufacturing.

The nebuliser outlet may comprise one or more gas inlets. One or more or each of the gas inlets may be arranged at the inlet end. Additionally or alternatively, one or more of each of the gas inlets may be arranged elsewhere between the inlet end and the outlet end, such as on a side wall of the nebuliser outlet between the inlet end and the outlet end.

The nebuliser outlet may be configured such that when a capillary is received by the first channel, gas provided to (one or more gas inlets of) the nebuliser outlet can pass via the one or more second channels to the outlet end.

The nebuliser outlet may be configured such that when a capillary is received by the first channel, gas provided to (one or more gas inlets of) the nebuliser outlet can pass via the one or more second channels to the outlet end, and can nebulise liquid emitted by the capillary.

The nebuliser outlet may comprise an outlet aperture arranged at the outlet end. The one or more second channels may be configured to pass gas (from the one or more gas inlets) to or adjacent to the outlet aperture. The nebuliser outlet may be configured such that when a capillary is received by the first channel, gas provided to (one or more gas inlets of) the nebuliser outlet can pass via the one or more second channels to the outlet end, and can nebulise liquid emitted by the capillary, such that a spray of droplets is emitted from the aperture.

The first channel is arranged between the inlet end and the outlet end. The first channel may extend along the entire length of the nebuliser outlet between the inlet end and the outlet end. The first channel may have an inlet arranged at the inlet end of the nebuliser outlet, and may have an outlet arranged at the outlet end of the nebuliser outlet.

Each of the one or more second channels is arranged between the inlet end and the outlet end. One or more or each of the one or more second channels may extend along the entire length of the nebuliser outlet between the inlet end and the outlet end, and/or one or more or each of the one or more second channels may extend along only part (some but not all) of the length of the nebuliser outlet between the inlet end and the outlet end. One or more or each second channel may have an inlet arranged at the inlet end of the nebuliser outlet or elsewhere between the inlet end and the outlet end, and may have an outlet arranged at or close to the outlet end of the nebuliser outlet.

The first channel may be separate from the one or more second channels at the inlet end. Alternatively, the one or more second channels may diverge from the first channel at one or more points along the length of the nebuliser outlet.

The first channel may be separate from the one or more second channels for at least some (but not all) of the length of the nebuliser outlet.

The first channel and the one or more second channels may converge at a convergence region within the nebuliser outlet. The convergence region may be arranged at or close to the outlet end and/or the outlet aperture. Alternatively, the nebuliser outlet may be configured such that the first channel and the one or more second channels other than (do not) converge within the nebuliser outlet Where there is a convergence region, the nebuliser outlet may be configured such that gas provided to the nebuliser outlet can meet (and nebulise) liquid emitted by the capillary in the convergence region. In other words, the convergence region may be a nebulisation region. In these embodiments, the nebuliser outlet may be configured such that, when the capillary is installed in the (first channel of the) nebuliser outlet, an outlet of the capillary is arranged in the convergence region.

Alternatively, the nebuliser outlet may be configured such that gas provided to the nebuliser outlet can meet (and nebulise) liquid emitted by the capillary in a nebulisation region downstream of the convergence region. Thus, the nebuliser outlet may be configured such that, when the capillary is installed in the (first channel of the) nebuliser outlet, the outlet of the capillary is arranged downstream of (protrudes beyond) the convergence region. In these embodiments, the nebulisation region may be within the nebuliser outlet, or external from (downstream of) the nebuliser outlet.

Where the nebuliser outlet is configured such that the first channel and the one or more second channels other than (do not) converge within the nebuliser outlet, the nebuliser outlet may be configured such that gas provided to the nebuliser outlet can meet (and nebulise) liquid emitted by the capillary in a nebulisation region external from (downstream of) the nebuliser outlet.

In various embodiments, the nebuliser outlet may be configured such that, when the capillary is installed in the (first channel of the) nebuliser outlet, the outlet of the capillary is arranged within the nebuliser outlet, such as being withdrawn from the outlet aperture.

Alternatively, the nebuliser outlet may be configured such that, when the capillary is installed in the (first channel of the) nebuliser outlet, the outlet of the capillary is arranged level (flush) with the nebuliser outlet.

The nebuliser outlet may instead be configured such that, when the capillary is installed in the (first channel of the) nebuliser outlet, the outlet of the capillary protrudes beyond the outlet aperture. In these embodiments, the nebuliser outlet may be configured such that, when the liquid capillary is installed in the (first channel of the) nebuliser outlet, gas received by the nebuliser outlet can pass to the outlet aperture via the one or more second channels, and can be emitted from the outlet end such as from the outlet aperture (optionally through an annulus between the capillary and the outlet aperture) so as to nebulise liquid emitted by the outlet of the capillary.

The outlet aperture may have a first area such as a first cross-sectional area. The outlet aperture may have a first diameter.

At least part of the first channel may have a second area such as a second cross-sectional area. At least part of the first channel may have a second diameter.

The second (cross-sectional) area may be approximately equal to or slightly larger than the (cross-sectional) area of the liquid capillary. The second diameter may be approximately equal to or slightly larger than the outer diameter of the liquid capillary.

The second (cross-sectional) area may be less than the first (cross-sectional) area. The second diameter may be less than the first diameter. However, it would be possible for the second (cross-sectional) area to be equal to or larger than the first (cross-sectional) area (and for the second diameter to be equal to or larger than the first diameter).

The nebuliser outlet may be configured such that when a capillary is received by the first channel, the capillary is retained relative to (such as centrally to) the outlet aperture by the first channel, for example by the at least part of the first channel that has the second area (that has the second diameter).

In some embodiments, the first channel is coaxially aligned with the outlet aperture. However, in other embodiments, the first channel may be offset from (not coaxially aligned with) the outlet aperture (in a radial direction).

At least part of the first channel may have an area (a cross-sectional area) that is less than an area (a cross-sectional area) of the outlet aperture. This may be so as to retain (the outlet of) a liquid capillary centrally to (in coaxial alignment with) the outlet aperture when the liquid capillary is installed in the nebuliser outlet.

Thus, embodiments provide a nebuliser outlet in which a liquid capillary can be retained in a substantially fixed position relative to (such as centrally to) the outlet aperture while at the same time allowing a nebulising gas to be provided to the outlet end such as to the outlet aperture. Retaining the liquid capillary relative to (such as centrally to) the outlet aperture in this manner can significantly reduce variation in the performance of the nebuliser, for example from one use to the next (for example after uninstalling and re-installing a liquid capillary), and from one nebuliser to the next.

The nebuliser outlet may be configured such that, when the capillary is installed in the (first channel of the) nebuliser outlet, the outlet of the capillary is arranged downstream of (protrudes beyond) the (first) part of the first channel that has the second area (second diameter).

The first channel may comprise a first part that has the second area (second diameter) and a funnel part arranged at the inlet end.

The funnel part may have a tiered configuration.

The one or more second channels may comprise an annular channel or a segmented annular channel.

The nebuliser outlet may comprise one or more overhangs arranged adjacent to an inlet or inlets to the one or more second channels.

According to an aspect, there is provided a nebuliser outlet comprising:
an inlet end and an outlet end;
an outlet aperture arranged at the outlet end;
a first channel arranged between the inlet end and the outlet end, wherein the first channel is coaxially aligned with the outlet aperture; and
one or more second channels arranged between the inlet end and the outlet end, wherein the one or more second channels are configured to pass gas from the inlet end to the outlet aperture;
wherein the nebuliser outlet comprises (is) a single integrated component.

Various embodiments are directed to a nebuliser outlet (a nebuliser outlet tip) having an inlet end and an outlet end that has an outlet aperture. A first channel and one or more second channels are arranged between the inlet end and the outlet end.

The first channel is coaxially aligned with the outlet aperture. At least part of the first channel may have an area (a cross-sectional area) that is less than an area (a cross-sectional area) of the outlet aperture. For example, at least part of the first channel may have a diameter that is less than the diameter of the outlet aperture. The first channel may be configured in this manner so as to retain (the outlet of) a liquid capillary centrally to (in coaxial alignment with) the outlet aperture when the liquid capillary is installed in the nebuliser outlet.

The one or more second channels are configured to pass gas from the inlet end to the outlet aperture. The nebuliser outlet may be configured in this manner such that, when the liquid capillary is installed in the nebuliser outlet, gas received at the inlet end is passed to the outlet end via the one or more second channels, and is emitted from the outlet aperture (through an annulus between the liquid capillary and the outlet aperture) so as to nebulise liquid emitted from the outlet of the liquid capillary.

It will be appreciated that various embodiments provide a nebuliser outlet in which a liquid capillary can be retained in a substantially fixed position relative to (such as centrally to) the outlet aperture while at the same time allowing a nebulising gas to be provided to the outlet aperture. As will be described in more detail below, retaining the liquid capillary relative to (centrally to) the outlet aperture in this manner can significantly reduce variation in the performance of the nebuliser, for example from one use to the next (for example after uninstalling and re-installing a liquid capillary), and from one nebuliser to the next.

Various embodiments accordingly provide an improved nebuliser outlet.

The nebuliser outlet may be formed using an additive manufacturing process.

The nebuliser outlet may be formed using Selective Laser Melting (SLM).

The nebuliser outlet may be formed using electron-beam additive manufacturing.

The outlet aperture may have a first area such as a first cross-sectional area. The outlet aperture may have a first diameter.

At least part of the first channel may have a second area such as a second cross-sectional area. At least part of the first channel may have a second diameter.

The second (cross-sectional) area may be less than the first (cross-sectional) area. The second diameter may be less than the first diameter.

The first channel may be configured to receive a capillary.

The nebuliser outlet may be configured such that when a capillary is received by the first channel, gas provided to the inlet end passes via the one or more second channels to the outlet aperture (and nebulises liquid emitted from the capillary).

The nebuliser outlet may be configured such that when a capillary is received by the first channel, gas provided to the inlet end passes via the one or more second channels to the outlet aperture and is emitted by the outlet aperture so as to nebulise liquid emitted from the capillary.

The nebuliser outlet may be configured such that when a capillary is received by the first channel, the capillary is retained relative to (centrally to) the outlet aperture by the first channel, for example by the at least part of the first channel that has the second area (that has the second diameter).

The first channel may comprise a first part that has the second area (second diameter) and a funnel part arranged at the inlet end.

The funnel part may have a tiered configuration.

The one or more second channels may comprise an annular channel.

The nebuliser outlet may comprise one or more overhangs arranged adjacent to an inlet or inlets to the one or more second channels.

According to an aspect, there is provided a nebuliser comprising:
the nebuliser outlet described above; and
a liquid capillary;
wherein the liquid capillary is retained by the first channel (for example by the at least part of the first channel that has the second area (second diameter)).

The nebuliser may be configured such that the liquid capillary is removable from the nebuliser outlet. The nebuliser may be configured such that a user can install the liquid capillary in the (first channel of the) nebuliser outlet by inserting the liquid capillary into the (first channel of the) nebuliser outlet. The nebuliser may be configured such that a user can remove the liquid capillary from the (first channel of the) nebuliser outlet.

The nebuliser may be configured such that, when the liquid capillary is installed in the nebuliser outlet, the distance (in an axial direction) between an outlet end of the capillary and the outlet end of the nebuliser outlet is adjustable (variable).

The liquid capillary may comprise one or more protrusions.

According to an aspect, there is provided a nebuliser comprising:
a nebuliser outlet comprising an inlet end and an outlet end, an outlet aperture arranged at the outlet end, a first channel arranged between the inlet end and the outlet end, wherein the first channel is coaxially aligned with the outlet aperture, and one or more second channels arranged between the inlet end and the outlet end, wherein the one or more second channels are configured to pass gas from the inlet end to the outlet aperture; and
a liquid capillary comprising one or more protrusions;
wherein the liquid capillary is retained by the first channel.

According to these aspects and embodiments, the nebuliser outlet may optionally comprise (may be) a single integrated component. Alternatively, the nebuliser outlet may comprise (may be) a multi-part component such as a two-part component, for example comprising a first part which may include the first and second channels, and a second nozzle part which may include the outlet aperture.

The one or more protrusions may be configured to interfere with an inner wall of the first channel when the liquid capillary is installed in the nebuliser outlet.

The one or more protrusions may be arranged at a distance from an outlet of the liquid capillary. The distance may be selected such that when the one or more protrusions interfere with an inner wall of the first channel (when the liquid capillary is installed in the nebuliser outlet), the outlet of the liquid capillary is arranged at a desired distance from the outlet aperture of the nebuliser outlet.

The nebuliser may comprise a gas supply tube attached to the inlet end of the nebuliser outlet.

An outlet end of the gas supply tube may be configured to be surrounded by the inlet end of the nebuliser outlet when the gas supply tube is attached to the inlet end of the nebuliser outlet.

According to an aspect, there is provided an ion source comprising the nebuliser outlet and/or the nebuliser described above.

The ion source may comprise a voltage source configured to apply a voltage to the liquid capillary. The liquid capillary may be formed from an electrically conductive material.

The ion source may comprise an Electrospray Ionisation (ESI) ion source, a Desorption Electrospray Ionisation (DESI) ion source, a Desorption Electro-Flow Focusing Ionisation (DEFFI) ion source, an impactor ion source, or an Atmospheric Pressure Chemical Ionisation (APCI) ion source.

According to an aspect, there is provided an analytical instrument such as a mass and/or ion mobility spectrometer, comprising the nebuliser outlet and/or the nebuliser and/or the ion source described above.

According to an aspect, there is provided a method of nebulising a liquid, the method comprising using the nebuliser outlet and/or the nebuliser described above to nebulise a liquid.

According to an aspect, there is provided a method of ionisation, the method comprising using the nebuliser outlet and/or the nebuliser and/or the ion source described above to ionise an analyte.

According to an aspect, there is provided a method of analysing an analyte, the method comprising using the ion source described above to ionise an analyte so as to produce analyte ions, and analysing the analyte ion and/or ions derived from the analyte ions.

Analysing the analyte ions and/or ions derived from the analyte ions may comprise determining the mass to charge ratio, mass, charge, ion mobility and/or collision cross section of the analyte ions and/or of the ions derived from the analyte ions, for example using an analytical instrument such as a mass and/or ion mobility spectrometer.

According to an aspect, there is provided a method of manufacturing a nebuliser outlet, the method comprising manufacturing the nebuliser outlet described above using an additive manufacturing process.

The additive manufacturing process may comprise Selective Laser Melting (SLM).

The additive manufacturing process may comprise electron-beam additive manufacturing.

Manufacturing the nebuliser outlet may comprise forming the nebuliser outlet from the outlet end to the inlet end or forming the nebuliser outlet from the inlet end to the outlet end.

BRIEF DESCRIPTION OF THE DRAWINGS

Various embodiments will now be described, by way of example only, and with reference to the accompanying drawings in which:

FIG. 12 shows schematically a close-up cross-sectional view of a nebuliser in accordance with various embodiments;

DETAILED DESCRIPTION

Figure 1:
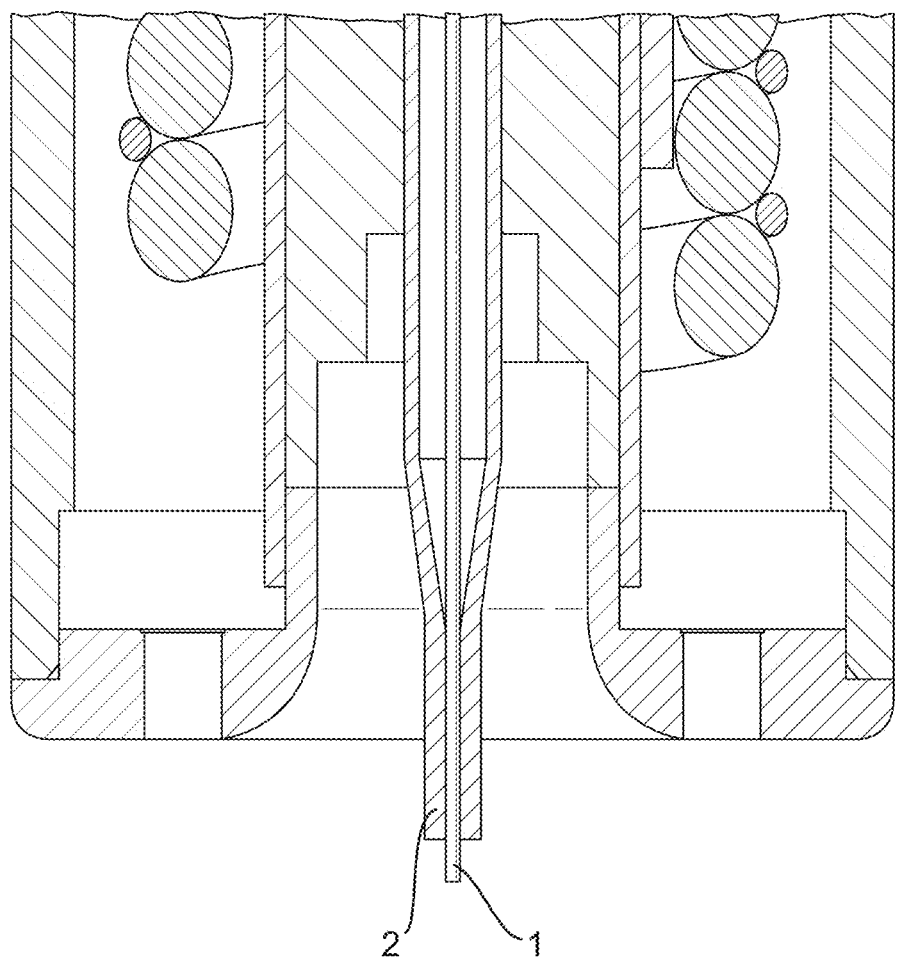
FIG. 1 shows schematically a cross-sectional view of a conventional Electrospray Ionisation (ESI) ion source nebuliser.

FIG. 1 shows schematically a cross sectional view of a conventional nebuliser of an Electrospray Ionisation (ESI) ion source. As shown in FIG. 1, the nebuliser comprises a liquid capillary 1 and a gas capillary 2. The liquid capillary 1 is arranged coaxially within the gas capillary 2, with the liquid-emitting outlet of the liquid capillary 1 extending beyond the distal end of the gas capillary 2. A flow of liquid supplied to the liquid capillary 1 is nebulised by a nebulising gas flow supplied to the gas capillary 2.

Figure 2A:
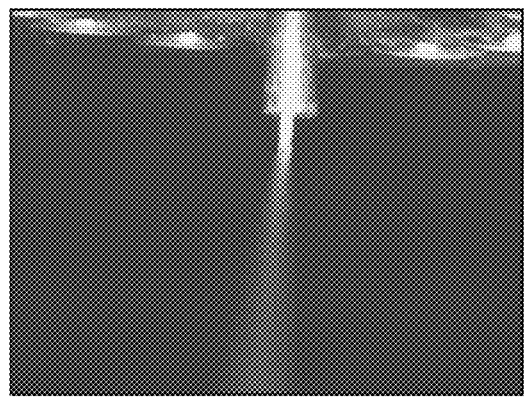
FIG. 2A shows an image of a conventional Electrospray Ionisation (ESI) ion source nebuliser.
Figure 2B:
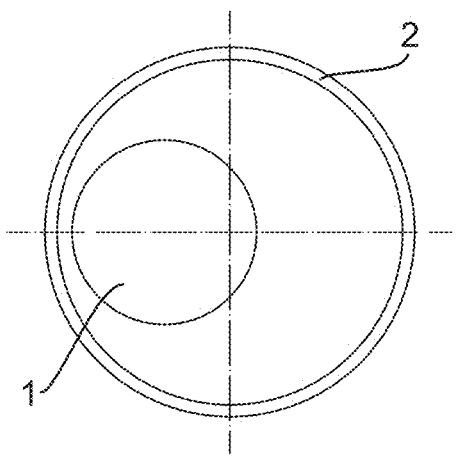
FIG. 2B shows schematically an end view of a conventional Electrospray Ionisation (ESI) ion source nebuliser.
Figure 2C:
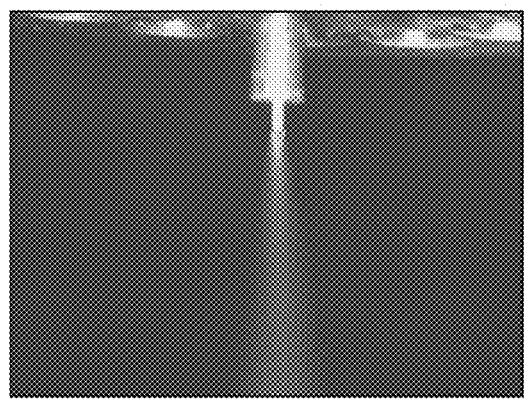
FIG. 2C shows an image of a conventional Electrospray Ionisation (ESI) ion source nebuliser.
Figure 2D:
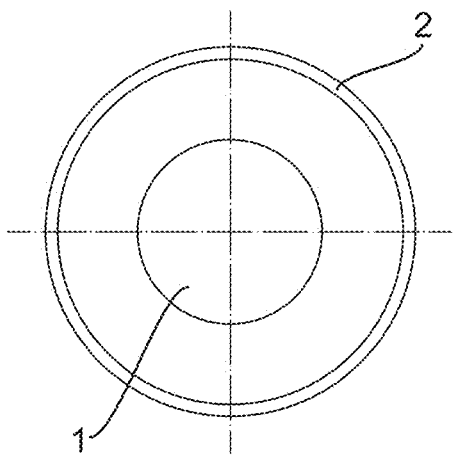
FIG. 2D shows schematically an end view of a conventional Electrospray Ionisation (ESI) ion source nebuliser.

FIGS. 2B and 2D show an end view of the conventional Electrospray Ionisation (ESI) ion source nebuliser. As can be seen in FIGS. 2B and 2D, a gap between the outer diameter of the liquid capillary 1 and the inner diameter of the gas capillary 2 creates an annulus through which the nebulising gas passes.

In this conventional design, the position of the liquid capillary 1 within the gas capillary 20 is not directly restrained by the gas capillary 2. Instead, the gas flow is relied upon to force the liquid capillary 1 into a central position within the gas capillary 2.

As shown in FIGS. 2C and 2D, when the liquid capillary 1 sits centrally within the gas capillary 2, an equal gas flow within the annulus creates an evenly distributed spray.

However, the Applicant has now recognised that it is possible for the liquid capillary 1 to sit to one side of the gas capillary 2. This may be due, for example, to manufacturing imperfections in the liquid capillary 1 (or the gas capillary 2) which mean that it may not be completely straight.

As shown in FIGS. 2A and 2B, the Applicant has also recognised that when the liquid capillary 1 sits to one side of the gas capillary 2, an uneven gas flow within the annulus creates an uneven spray. This can lead to undesired variation in performance of the nebuliser, and therefore in the ion source and the analytical instrument.

Various embodiments are directed to a nebuliser outlet (a nebuliser outlet tip) of a nebuliser, such as a nebuliser of an ion source such as an Electrospray Ionisation (ESI) ion source.

The nebuliser outlet has an inlet end, and an outlet end that has an outlet aperture. A first channel and one or more second channels are arranged between the inlet end and the outlet end.

The first channel may be coaxially aligned (or non-coaxially aligned) with the outlet aperture. At least part of the first channel may optionally have an area (a cross-sectional area) that is less than the (cross-sectional) area of the outlet aperture. For example, at least part of the first channel may have a diameter that is less than the diameter of the outlet aperture. The first channel may be configured in this manner so as to retain (the outlet of) a liquid capillary relative to (such as centrally to and/or in coaxial alignment with) the outlet aperture when the liquid capillary is installed in the nebuliser outlet.

The one or more second channels may be configured to pass gas from a gas inlet (which may optionally be arranged at the inlet end) to the outlet end, such as to the outlet aperture. The nebuliser outlet may be configured in this manner such that, when the liquid capillary is installed in the nebuliser outlet, gas received at the inlet end is passed to the outlet end via the one or more second channels, and is emitted from the outlet end such as from the outlet aperture (optionally through an annulus between the liquid capillary and the outlet aperture) so as to nebulise liquid emitted from the outlet of the liquid capillary.

As will be described in more detail below, various embodiments provide a nebuliser outlet in which a liquid capillary can be retained relative to (centrally to) the outlet aperture while at the same time allowing a nebulising gas to be provided to the outlet aperture.

Retaining the liquid capillary relative to (centrally to) the outlet aperture in this manner means that the nebuliser can produce an evenly distributed spray, and can significantly reduce variation in the performance of the nebuliser, for example from one use to the next (for example after uninstalling and re-installing a liquid capillary), and from one nebuliser to the next.

Various embodiments accordingly provide an improved nebuliser outlet.

Figure 3A:
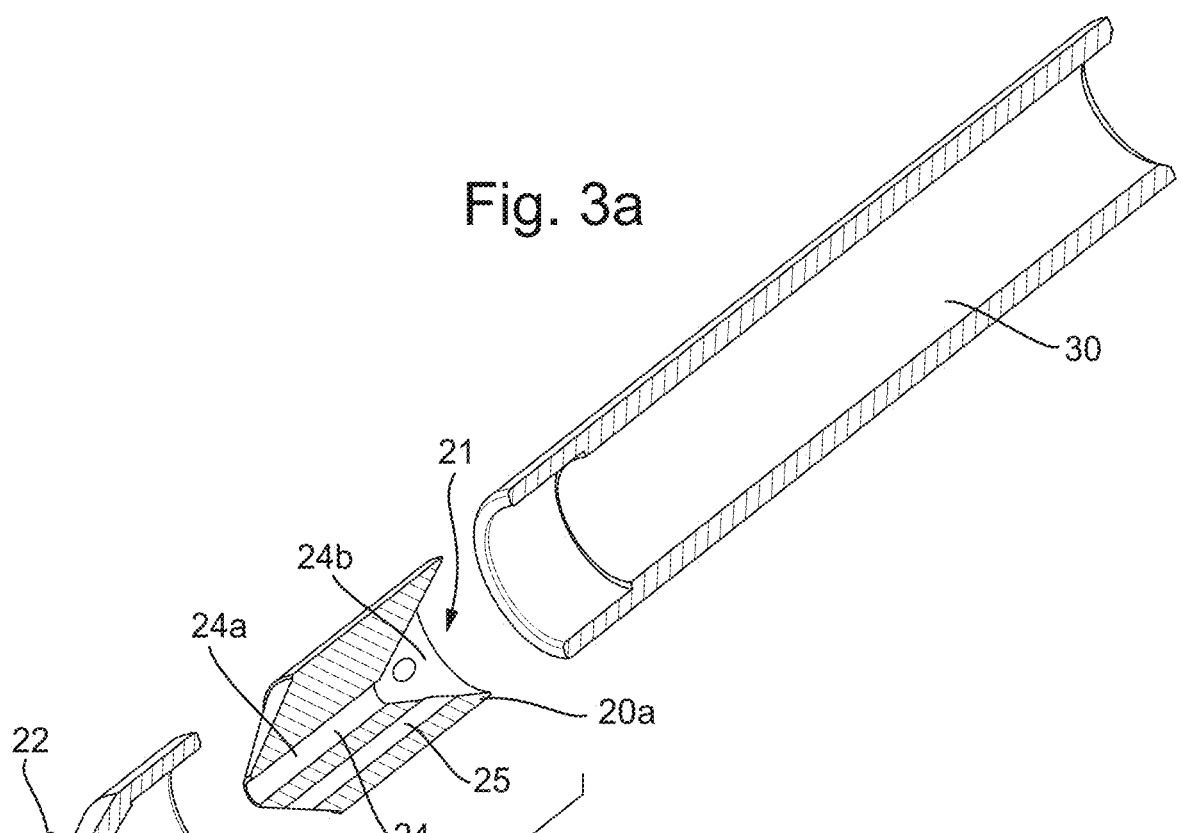
FIG. 3A shows schematically an exploded cross-sectional view of a nebuliser assembly in accordance with various embodiments.
Figure 3B:
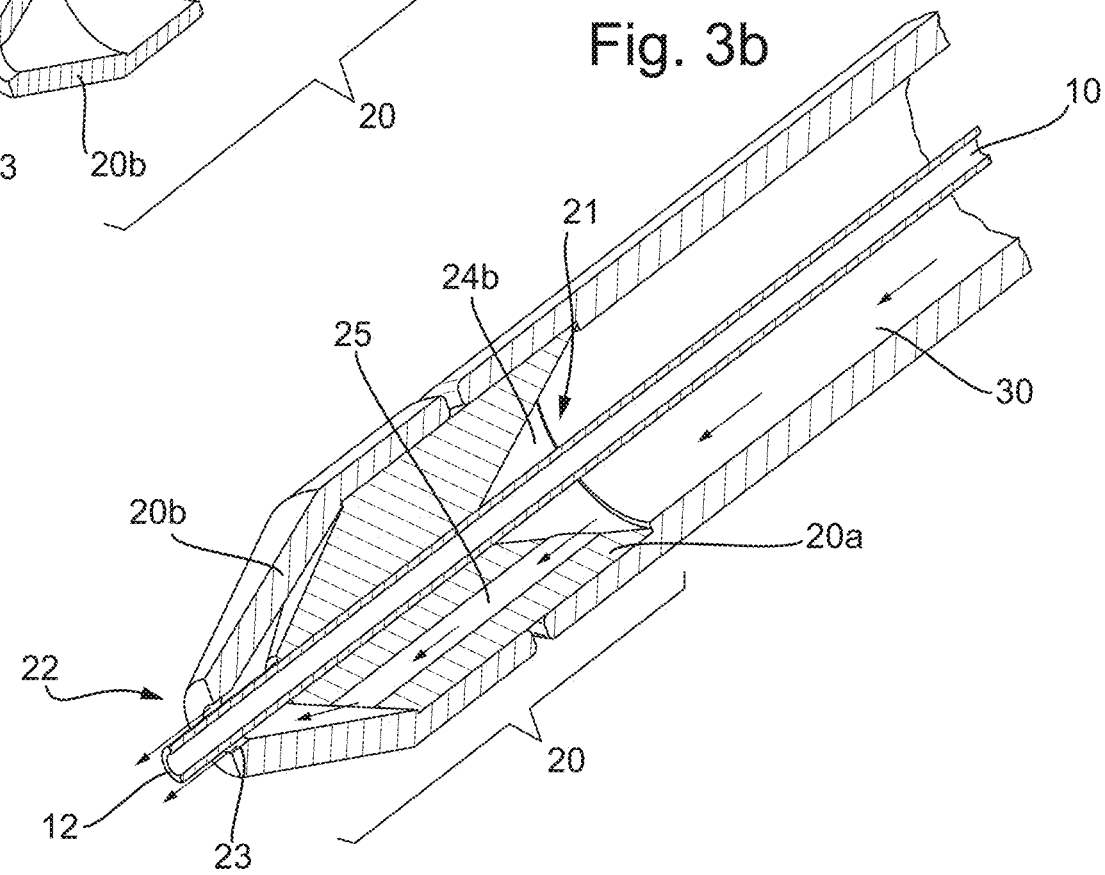
FIG. 3B shows schematically a cross-sectional view of a nebuliser assembly in accordance with various embodiments.

FIG. 3A shows schematically an exploded cross-sectional view of a nebuliser assembly in accordance with various embodiments, and FIG. 3B shows schematically a cross-sectional view of a nebuliser assembly in accordance with various embodiments.

As shown in FIG. 3A, the nebuliser assembly comprises a nebuliser outlet 20 which has an inlet end 21 and an outlet end 22. The nebuliser assembly 20 may have a central axis, which may extend between the inlet end 21 and the outlet end 22 in an axial direction. A radial direction may extend outwardly from the central axis (may have the central axis as its origin).

The nebuliser outlet 20 may be configured to emit a spray of droplets (generally in the axial direction), such as a spray of nebulised droplets, from its outlet end 22. To do this, the nebuliser outlet 20 may be configured to receive at its inlet end 21 a flow of liquid and a flow of gas, and to cause the liquid to be nebulised by the gas so as to produce the spray of droplets.

The nebuliser outlet 20 may be configured to receive the flow of gas from a tube 30 such as a gas supply tube which may be connected to the nebuliser outlet 20. The inlet end 21 of the nebuliser outlet 20 may be configured to be attached to the tube 30, for example in a gas tight manner, such that gas provided to an inlet of the tube 30 is provided to the inlet end 21 of the nebuliser outlet 20.

An outlet end of the tube 30 may be configured to surround (or to be surrounded by) the inlet end 21 of the nebuliser outlet 20 when the nebuliser outlet 20 is attached to the tube 30, for example such that the nebuliser outlet 20 can be attached to the tube 30 in a gas tight manner. The nebuliser outlet 20 can be attached to the tube 30 in any suitable manner, such as for example, using an interference fit, weld, glue, and the like, between the outlet end of the tube 30 and the inlet end 21 of the nebuliser outlet 20.

The nebuliser outlet 20 may be configured to receive the flow of liquid via a liquid capillary 10. The liquid capillary 10 may comprise an inlet end and an outlet end, and may be configured such that liquid provided to the inlet is emitted from the outlet end.

The liquid capillary 10 may have any suitable configuration, such as for example, the configuration described in WO 2015/040384, the content of which is incorporated herein by reference.

The liquid capillary 10 may have any suitable outer dimeter, such as for example (i)<0.1 mm; (ii) 0.1-0.15 mm; (iii) 0.15-0.2 mm; (iv) 0.2-0.25 mm; (v) 0.25-0.3 mm; or (vi)>0.3 mm. In various particular embodiments, the liquid capillary 10 has an outer diameter of approximately 0.22 mm.

The liquid capillary 10 may be formed from an electrically conductive material such as a metal such as stainless steel. In embodiments, a voltage such as a high voltage may be applied to the liquid capillary 10, for example such that the spray of droplets emitted by the nebuliser outlet 20 comprises a spray of charged droplets, for example in the manner of an Electrospray Ionisation (ESI) ion source.

The nebuliser outlet 20 may be configured to receive and retain (in place) the liquid capillary 10. When installed in the nebuliser outlet, the liquid capillary 10 may pass through the (centre of the) tube 30 and through the (centre of the) nebuliser outlet 20. That is, the liquid capillary 10 may be arranged along the central axis of the nebuliser outlet 20. However, it would also be possible for the liquid capillary 10 to be arranged in a non-concentric manner, such as (at least partially) parallel to the central axis of the nebuliser outlet 20.

The outlet end 22 of the nebuliser outlet 20 comprises an outlet aperture 23. The outlet aperture 23 may be arranged on (coaxial with) the central axis of the nebuliser outlet 20. However, it would also be possible for the outlet aperture 23 to be arranged in a non-coaxial manner, such as off-axis from the central axis of the nebuliser outlet 20.

As shown in FIG. 3B, the nebuliser outlet 20 may be configured such that, when the liquid capillary 10 is installed in the nebuliser outlet 20, the outlet (tip) 12 of the liquid capillary 10 passes through and protrudes beyond the outlet aperture 23. The outlet 12 of the liquid capillary 10 may protrude beyond the outlet aperture 23 by any suitable distance, such as for example by around (i) 0-0.5 mm; (ii) 0.5-1.0 mm; (iii) 1.0-1.5 mm; or (iv)>1.5 mm.

Alternatively, the nebuliser outlet 20 may be configured such that, when the liquid capillary 10 is installed in the nebuliser outlet 20, the outlet (tip) 12 of the liquid capillary 10 does not protrude beyond the outlet aperture 23, but is instead arranged within the outlet 20 and withdrawn from the outlet aperture 23. In these embodiments, the outlet 12 of the liquid capillary 10 may be withdrawn from the outlet aperture 23 by any suitable distance, such as for example by around 0-0.5 mm.

The nebuliser outlet 20 may be configured such that when the liquid capillary 10 is installed in the nebuliser outlet 20, an annulus is formed between the (outer diameter of the) liquid capillary 10 and the (inner diameter of the) outlet aperture 23. The nebuliser outlet 20 may be configured such that, when the liquid capillary 10 is installed in the nebuliser outlet 20, gas received at the inlet end 21 is emitted from the outlet aperture 23 through the annulus, so as to nebulise liquid emitted from the outlet 12 of the liquid capillary 10. (Other arrangements are possible, e.g. as described below).

Thus, the outlet aperture 23 has a first (cross-sectional) area, which may be larger than a (cross-sectional) area of the liquid capillary 10. For example, the outlet aperture 23 may have a first (inner) diameter, which may be larger than an outer diameter of the liquid capillary 10. The outlet aperture 23 may have any suitable inner diameter (which is larger than the outer diameter of the liquid capillary 10), such as for example (i)<0.2 mm; (ii) 0.2-0.25 mm; (iii) 0.25-0.3 mm; (iv) 0.3-0.35 mm; (v) 0.35-0.4 mm; or (vi)>0.4 mm. In various particular embodiments, the outlet aperture 23 has an inner diameter of approximately 0.31 mm.

The nebuliser outlet 20 comprises a first (internal) channel 24 arranged between the inlet end 21 and the outlet end 22. The first channel 24 may be arranged to extend along the central axis of the nebuliser outlet 20 (or may be off-axis).

The first channel 24 may be configured to receive the liquid capillary 10 when the liquid capillary 10 is installed in the nebuliser outlet 20. Thus, the first channel 24 is (coaxially) aligned with the outlet aperture 23, for example such that when the liquid capillary 10 is installed in the nebuliser outlet 20, the liquid capillary 10 passes through the first channel 24 (and optionally also passes through and protrudes beyond the outlet aperture 23).

The first channel 24 may also be configured to retain the liquid capillary 10 (that is, to hold the liquid capillary in place, relative to the nebuliser outlet 20, at least in the radial direction). In particular, the first channel 24 may be configured such that when the liquid capillary 10 is installed in the nebuliser outlet 20, the first channel 24 retains the (outlet of the) liquid capillary 10 centrally to (such as in coaxial alignment with) the outlet aperture 23.

To do this, at least part of the first channel 24*a* may have a second (cross-sectional area) that is less than the first (cross-sectional) area. For example, at least part of the first channel 24*a* may have a second (inner) diameter that is less than the first diameter. The second area may be approximately equal to or slightly larger than the (cross-sectional) area of the liquid capillary 10 (and the second diameter may be approximately equal to or slightly larger than the outer diameter of the liquid capillary 10), such that the (outlet of the) liquid capillary 10 is retained relative to (centrally to and/or in coaxial alignment with) the outlet aperture 23 when the liquid capillary 10 is passed through the first channel 24.

The second diameter may be, for example, around (i)<0.1 mm; (ii) 0.1-0.15 mm; (iii) 0.15-0.2 mm; (iv) 0.2-0.25 mm; (v) 0.25-0.3 mm; or (vi)>0.3 mm. In various particular embodiments, the at least part of the first channel 24*a* has a second (inner) diameter of approximately 0.25 mm.

In some embodiments, the first channel 24 may have the same cross-sectional area (the same inner diameter) along its entire (axial) length. In these embodiments, the first channel 24 may be a tube such as a generally cylindrical tube having the second cross sectional area (second diameter), which may be arranged to extend along the central axis of the nebuliser outlet 20.

However, in various particular embodiments, as shown in FIGS. 3A and 3B, the first channel 24 may have plural different cross sectional areas (plural different inner diameters) along its (axial) length (where at least part of the first channel 24*a* has the second cross sectional area (second diameter) that is less than the first cross sectional area (first diameter)).

For example, as shown in FIGS. 3A and 3B, the first channel 24 may comprise a first tubular part 24*a* that has the second cross sectional area (second diameter) and a second funnel part 24*b* that has a varying cross sectional area (varying diameter) (that is greater than the second cross sectional area (second diameter)). In these embodiments, the first part 24*a* of the first channel 24 may be a tube such as a generally cylindrical tube having the second cross sectional area (second diameter), which may be arranged to extend along the central axis of the nebuliser outlet 20. (Other arrangements are possible, e.g., as described below).

The funnel part 24*a* may be configured such that its cross-sectional area (its inner diameter) decreases from the inlet end 21 towards the outlet end 22, for example from around the cross sectional area (the inner diameter) of the tube 30 to around the second cross sectional area (the second diameter).

The funnel part 24*b* may be arranged at or close to the inlet end 21 of the nebuliser outlet 20, while the tubular part 24*a* may be arranged relatively closer to the outlet end 22 of the nebuliser outlet 20. Arranging a funnel part 24*b* at the inlet end 21 of the nebuliser outlet 20 in this manner facilitates more straightforward installation of the liquid capillary 10 in the nebuliser outlet 20, as the funnel part 24*b* may in effect guide the liquid capillary 10 into the tubular part 24*a* when the liquid capillary 10 is being installed, for example so as to avoid the liquid capillary 10 snagging when it is being installed in the outlet 20. This is particularly beneficial as installation of the liquid capillary 10 is effectively "blind", as the inlet of the tubular part 24*a* cannot be seen by a user.

The part of the first channel 24 that has the second cross sectional area (second diameter) (such as the first part 24*a* of the first channel 24) may have any suitable length and may be located at any suitable position relative to the outlet end 22 of the nebuliser outlet 20.

The part of the first channel 24 that has the second cross sectional area (second diameter) (such as the first part 24a of the first channel 24) may have a length that is long enough that the liquid capillary 10 is suitably constrained by the first channel 24, and retained relative to (centrally to and/or in coaxial alignment with) the outlet aperture 23. Suitable lengths for the part of the first channel 24 that has the second cross sectional area (second diameter) (such as the first part 24a of the first channel 24) may be, for example, at least 1.5 times the diameter of the capillary, at least two times the diameter of the capillary, or more. The first part 24a of the first channel 24 may have the second cross sectional area (second diameter) for all of this length, or for some but not all of this length. The first part 24a of the first channel 24 may have the second cross sectional area (second diameter) at at least two points along its length (i.e. where the two points are separated by the above length).

Similarly, the part of the first channel 24 that has the second cross sectional area (second diameter) (such as the first part 24a of the first channel 24) may be located close enough to the outlet end 22 of the nebuliser outlet 20 that the liquid capillary 10 is suitably constrained by the first channel 24, and retained relative to (centrally to and/or in coaxial alignment with) the outlet aperture 23. For example, the part of the first channel 24 that has the second cross sectional area (second diameter) (such as the first part 24a of the first channel 24) may be arranged within a distance of about (i) 0-0.5 mm; (ii) 0.5-1.0 mm; (iii) 1.0-1.5 mm; or (iv)>1.5 mm from the outlet aperture 23.

The nebuliser outlet 20 comprises one or more second (internal) channels 25 arranged between the inlet end 21 and the outlet end 22. Each of the one or more second channels 25 may each be arranged to run alongside the central axis of the nebuliser outlet 20, such as being (at least in part) parallel to the central axis of the nebuliser outlet 20 (and so parallel to the first channel 24). However, one or more or each second channel need not be entirely or precisely parallel to the central axis. In general, one or more or each second channel may have any suitable configuration such as a tapered configuration, zig-zag configuration, helix configuration, matrix configuration, and the like.

The one or more second channels 25 are configured to pass gas from the inlet end 21 to the outlet aperture 23 (as indicated by the arrows in FIG. 3B). In other words, the one or more second channels 25 are configured such that gas received at the inlet end 21 is passed to the outlet aperture 23 via the one or more second channels 25 (and bypasses the first channel 24).

In particular, the one or more second channels 25 may be configured such that when the liquid capillary 10 is installed in the nebuliser outlet 20, gas received at the inlet end 21 is passed to the outlet end 22 via the one or more second channels 25, and is emitted from the outlet end such as from the aperture 23 (optionally through an annulus between the liquid capillary 10 and the outlet aperture 23) so as to nebulise liquid emitted from the outlet of the liquid capillary 10.

To do this, an inlet end of each second channel 25 may be arranged at or close to the inlet end 21 of the nebuliser outlet 20, and may be configured to receive gas, for example, from the gas supply tube 30. For example, as shown in FIG. 3A, an inlet end of each second channel 25 may be arranged within the funnel part 24*b* of the first channel 24. An outlet end of each second channel 25 may be arranged at or close to the outlet end 22 of the nebuliser outlet 20, and may be in fluid communication with the outlet aperture 23, such that gas received at the inlet end of the channel is provided to and emitted from the outlet aperture 23.

Since (as described above) the first part 24*a* of the first channel 24 may have a cross-sectional area (e.g. diameter) that is similar to (e.g. equal to or slightly larger than) the cross-sectional area (e.g. outer diameter) of the capillary 10, most or all of the gas received by the outlet 20 (at the inlet end 21) will (be forced to) pass to the outlet end 22 via the one or more second channel(s) 25.

Alternatively, an inlet end of one or more or each second channel 25 may be arranged at some other point along the length of the nebuliser outlet 20.

Each second channel may have any suitable form. For example, each second channel may be a tube such as a generally cylindrical tube, which may be arranged to extend parallel to the central axis of the nebuliser outlet 20. Other cross section shapes would be possible.

Each inlet of each second channel may have a diameter or width that is less than a corresponding diameter or width of the inlet of the first channel. This may be so as to reduce the likelihood of the liquid capillary 10 snagging on a second channel inlet when being installed in the outlet 20.

The nebuliser outlet 20 may comprise any suitable number of second channels. For example, the nebuliser outlet 20 may comprise a single second channel, or plural second channels, such as two, three, four, five or more second channels.

Where there are plural second channels, each channel may be substantially identical (although this need not be the case), and may for example, be arranged in a rotationally symmetric configuration (about the central axis of the nebuliser outlet 20) (although this need not be the case).

Configuring the nebuliser outlet 20 to have one or more second channels 25 in addition to the first channel 24 in this manner means that the liquid capillary 10 can be retained relative to (such as centrally to) the outlet aperture 23 while at the same time allowing a nebulising gas to be provided to the outlet end 22 such as to the outlet aperture 23 via the one or more second channels 24. This means that the nebuliser outlet 20 can produce an evenly distributed spray, and can significantly reduce variation in the performance of the nebuliser outlet 20, for example from one use to the next (for example after uninstalling and re-installing a liquid capillary 10), and from one nebuliser outlet 20 to the next.

FIG. 3A shows an illustrative exploded view of the nebuliser outlet 20 of various embodiments, in which the nebuliser outlet 20 is shown as comprising a first part 20*a* which includes the first 24 and second 25 channels, and a second nozzle part 20*b* which includes the outlet aperture 23. As described above, in various embodiments the nebuliser outlet 20 is (comprises) a single integrated component, and so the first part 20*a* and the second part 20*b* may be formed together as a single integrated component.

In this regard, the Applicant has recognised that a multi-part construction of the nebuliser outlet 20 would not be an optimum construction. In particular, the Applicant has recognised that the use of multiple components can lead to cumulative manufacturing imperfections and/or inter-part variations, but that (as described above) manufacturing imperfections and/or inter-part variations can lead to the nebuliser outlet 20 producing an uneven spray.

Thus, the nebuliser outlet 20 may comprise (may be) a single component which includes the first 24 and second 25 channels, and the outlet aperture 23. Forming the nebuliser outlet 20 as a single integrated component can significantly reduce manufacturing imperfections, and thereby reduce variation in the performance of the nebuliser outlet 20, for example from one use to the next (for example after uninstalling and re-installing the liquid capillary 10), and from one nebuliser outlet 20 to the next.

In these embodiments, the nebuliser outlet 20 may be formed using an additive manufacturing process. The nebuliser outlet 20 may be formed from any suitable material such as a metal. Thus, the nebuliser outlet 20 may be formed using a metal additive manufacturing process.

In particular, the Applicant has found that the nebuliser outlet 20 can be formed with appropriate dimensions (as described above) and precision using selective laser melting (SLM). Thus, in various particular embodiments, the nebuliser outlet 20 is formed using selective laser melting (SLM).

Selective laser melting (SLM) is an additive manufacturing process that uses a laser to melt and fuse metallic particles, which when solidified form layers of the part. A layer of powder is applied to a build platform, and the powder is selectively fused by a laser beam. The build platform is then lowered, and the procedure is repeated so as to build up layers of the part one by one. Selective laser melting (SLM) allows highly complex parts to be manufactured, and without the need for specific tooling.

The skilled person will understand that "selective laser melting" ("SLM") is known by a number of other names, such as for example (i) direct metal laser melting (DMLM); (ii) laser powder fusion (LPF); (iii) laser powder bed fusion (LPBF); (iv) laser sintering; (v) micro laser sintering; (vi) selective laser sintering (SLS); (vii) laser deposition; (viii) laser cladding; (ix) direct metal deposition (DMD); (x) laser metal deposition (LMD); (xi) direct metal laser deposition (DMLD); (xii) direct metal casting (DMC); and so on. As used herein the term "selective laser melting" is intended to encompass all such processes.

Various other metal additive manufacturing processes could instead be used to form the nebuliser outlet 20. In particular, the nebuliser outlet 20 may be formed using electron-beam additive manufacturing (also known as electron-beam melting (EBM)). Electron-beam additive manufacturing is an additive manufacturing process that works in a similar manner to selective laser melting (SLM), but that uses an electron beam to melt and fuse metallic particles.

In particular embodiments, the nebuliser outlet 20 is formed entirely by an additive manufacturing process. In alternative embodiments the nebuliser outlet 20 may be formed using a combination of an additive manufacturing process with a (more conventional) subtractive manufacturing process. It would also be possible to form the nebuliser outlet 20 using (only) a (conventional) subtractive manufacturing process.

The design of the nebuliser outlet 20 of various embodiments has been optimised with respect to this process and/or the material(s) used in this process.

Figure 4A:
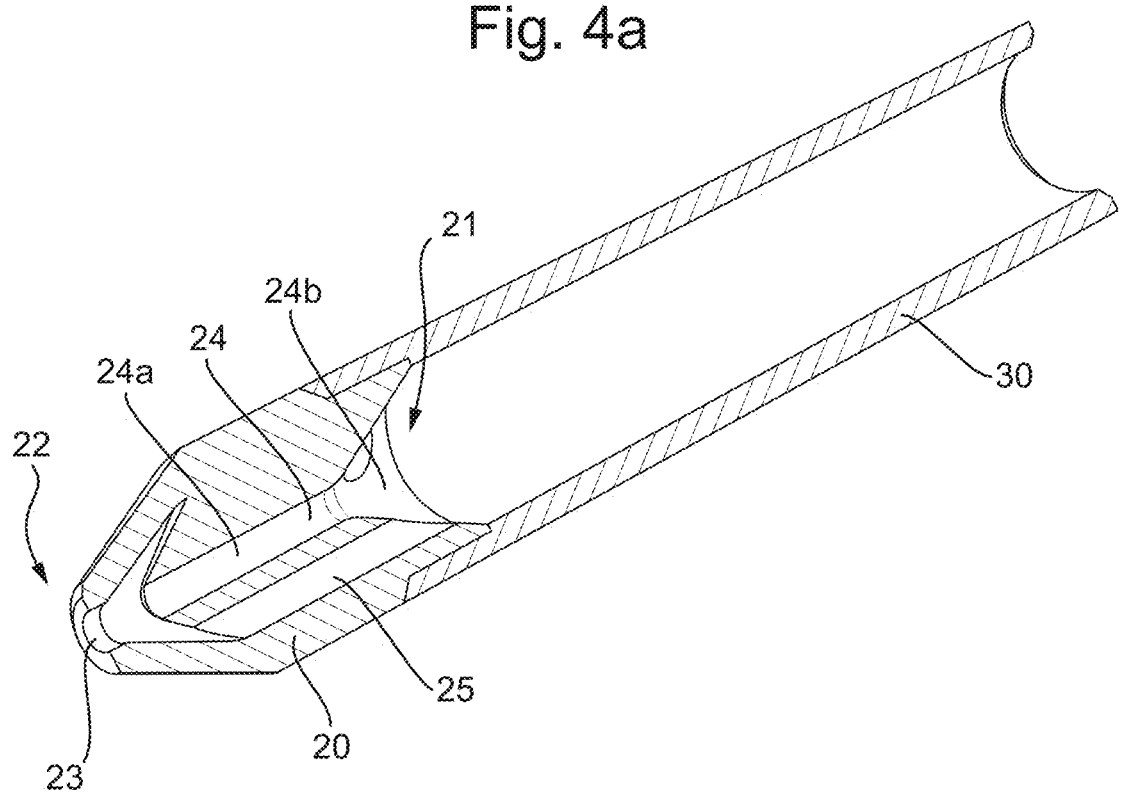
FIG. 4A shows schematically a cross-sectional view of a nebuliser assembly in accordance with various embodiments.
Figure 4B:
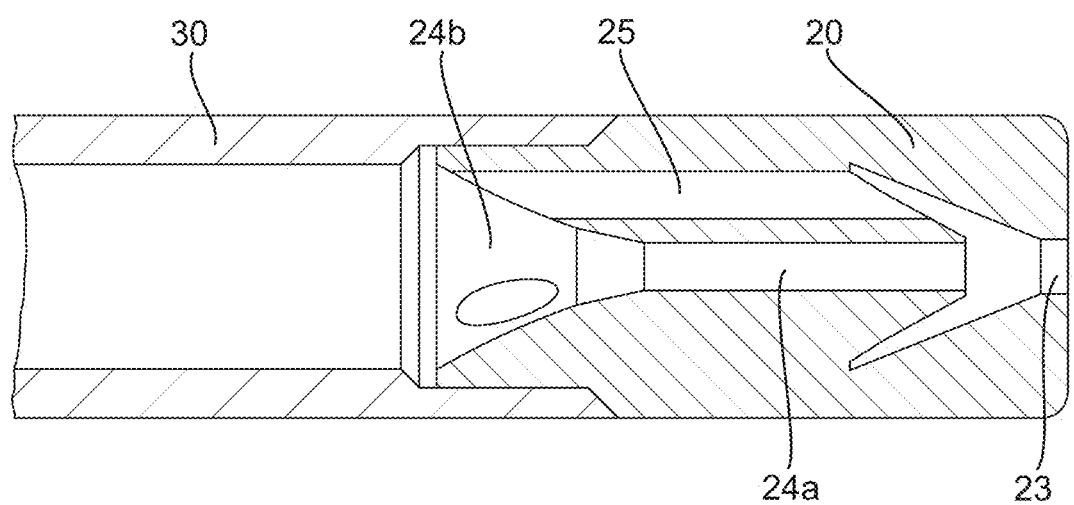
FIG. 4B shows schematically a cross-sectional view of a nebuliser assembly in accordance with various embodiments.

FIGS. 4A and 4B show schematically cross-sectional views of a nebuliser assembly in accordance with these embodiments.

The nebuliser assembly of FIGS. 4A and 4B is substantially similar to the nebuliser assembly described above and shown in FIGS. 3A and 3B, except that the nebuliser outlet 20 is shown as having a one-piece construction.

Thus, as shown in FIGS. 4A and 4B, the nebuliser assembly comprises a nebuliser outlet 20 which has an inlet end 21 and an outlet end 22, with an outlet aperture 23 arranged at the outlet end 22 that has a first cross section area (first diameter). A first channel 24 is arranged between the inlet end 21 and the outlet end, 22 wherein the first channel 24 is coaxially aligned with the outlet aperture 23. At least part 24a of the first channel 24 may have a second cross section area (second diameter) that is less than the first cross section area (first diameter). One or more second channels 25 are arranged between the inlet end 21 and the outlet end 22, wherein the one or more second channels 25 are configured to pass gas from the inlet end 21 to the outlet aperture 23.

The nebuliser assembly 20 may have any one or more or each of the optional features described herein, and may be configured substantially as described above (in relation to FIGS. 3A and 3B). The nebuliser outlet 20 has a one-piece construction.

Figure 5:
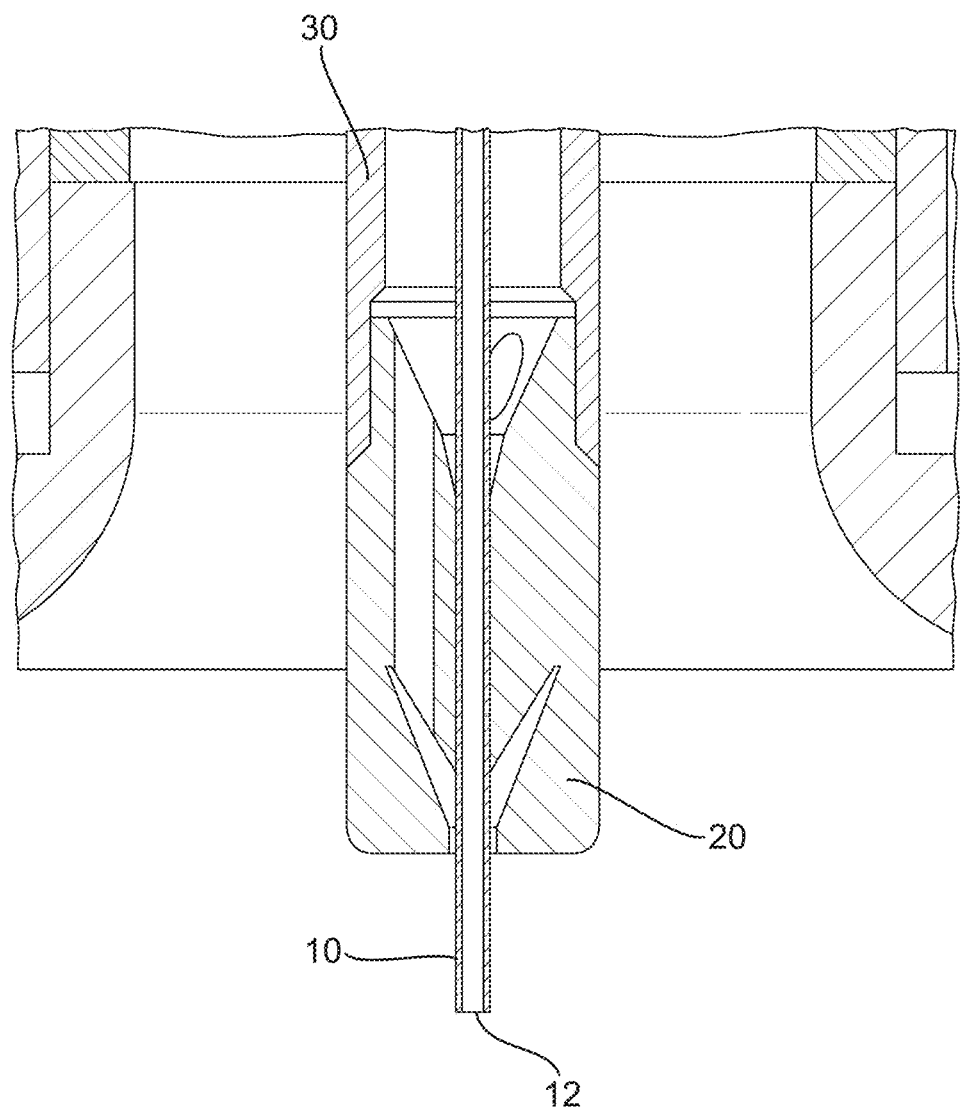
FIG. 5 shows schematically a cross-sectional view of an Electrospray Ionisation (ESI) ion source nebuliser in accordance with various embodiments.

FIG. 5 shows the nebuliser assembly of FIGS. 4A and 4B, when it is installed in an Electrospray Ionisation (ESI) ion source.

The nebuliser outlet 20 is configured such that, when a liquid capillary 10 is installed in the nebuliser outlet 20, gas received at the inlet end 21 is passed to the outlet end 22 via the one or more second channels 25, and is emitted from the outlet aperture 23 through an annulus between the liquid capillary 10 and the outlet aperture 23, so as to nebulise liquid emitted from the outlet 12 of the liquid capillary 10.

The nebuliser outlet 20 is configured such that the liquid capillary 10 is retained relative to (such as centrally to) the outlet aperture 23 by the first channel 24 while at the same time allowing a nebulising gas to be provided to the outlet aperture 23 via the one or more second channels 24. This means that the nebuliser outlet 20 can produce an evenly distributed spray, and can significantly reduce variation in the performance of the nebuliser outlet 20, for example from one use to the next (for example after uninstalling and re-installing a liquid capillary 10), and from one nebuliser outlet 20 to the next.

The Applicant has made a number of further improvements to the single piece nebuliser outlet 20 of FIGS. 4A, 4B and 5. These improvements may be particularly beneficial in the context of manufacturing a single piece nebuliser outlet 20 using additive manufacturing techniques such as SLM.

FIGS. 6 and 7 show schematically cross-sectional views of a nebuliser assembly in accordance with various embodiments. The nebuliser assembly of FIGS. 6 and 7 is substantially similar to the nebuliser assembly described above and shown in FIGS. 3A-5.

As shown in FIGS. 6 and 7, in various embodiments, the one or more second channels 25 comprises an annular channel. In these embodiments, as shown in in FIGS. 6 and 7, an outlet end of the annular channel 25 may be in fluid communication with the outlet aperture 23, for example via one or more channels 25*b* which may be extend in the radial direction. This arrangement has been found to improve reproducibility with respect to the manufacturing process. In particular, an annular channel 25 is much less susceptible to being blocked by excess powder during the additive manufacturing (e.g. SLM) process, when compared with individual tubular channels (which can become blocked with excess powder).

The width of the annular channel 25 may be selected so that the wall between the annular channel 25 and the first channel 24 provides mechanical stability, while also allowing sufficient gas flow through nebuliser outlet 20 via the second channel 25.

As also shown in FIGS. 6 and 7, the funnel part 24*b* of the first channel 24 may have a tiered configuration. That is, the funnel part 24*b* may be configured such that its cross-sectional area (inner diameter) decreases from the inlet end 21 towards the outlet end 22 (for example from around the cross-sectional area (inner diameter) of the tube 30 to around the second area (second diameter)) in a tiered manner.

Figure 6:
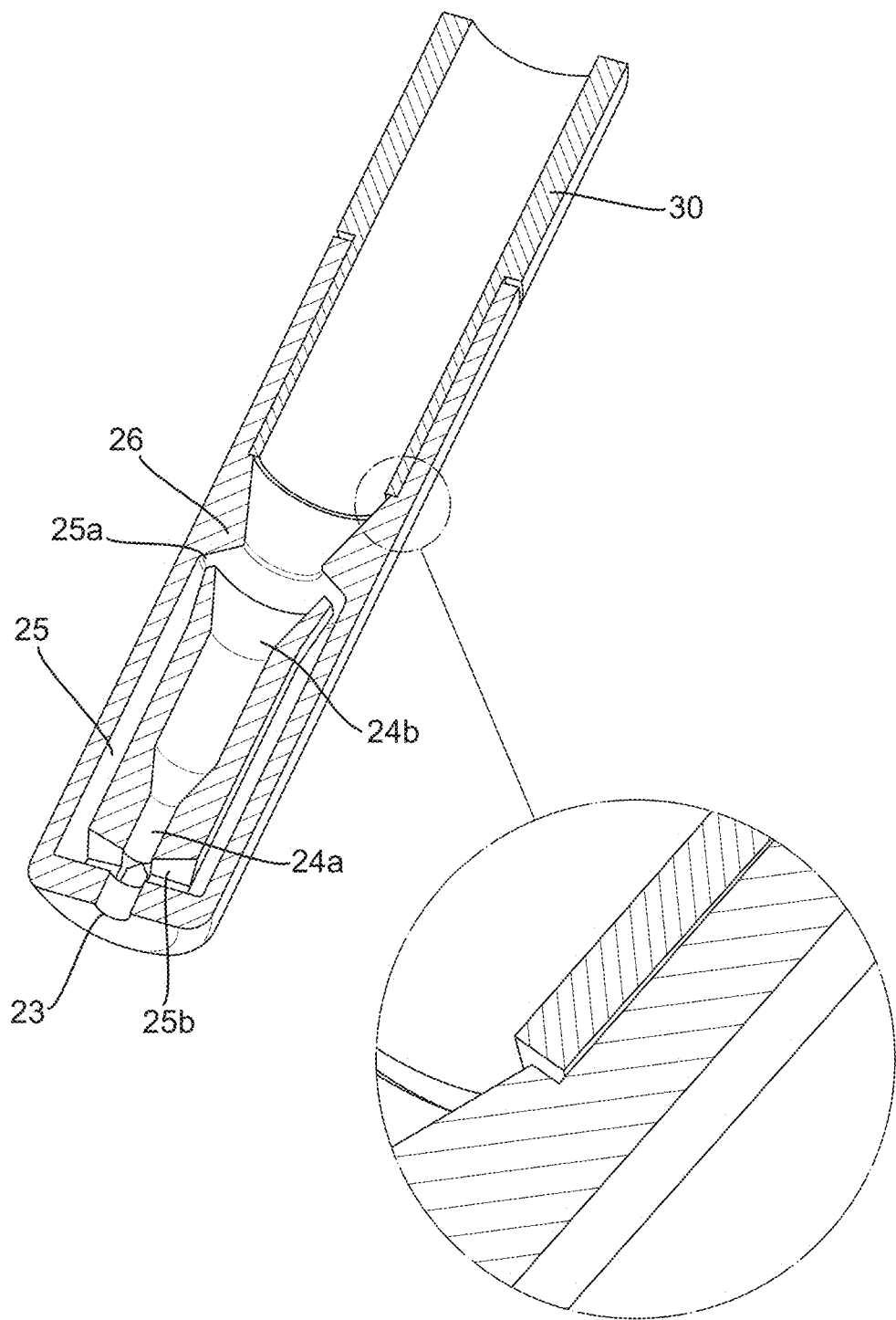
FIG. 6 shows schematically a cross-sectional view of a nebuliser assembly in accordance with various embodiments.
Figure 7:
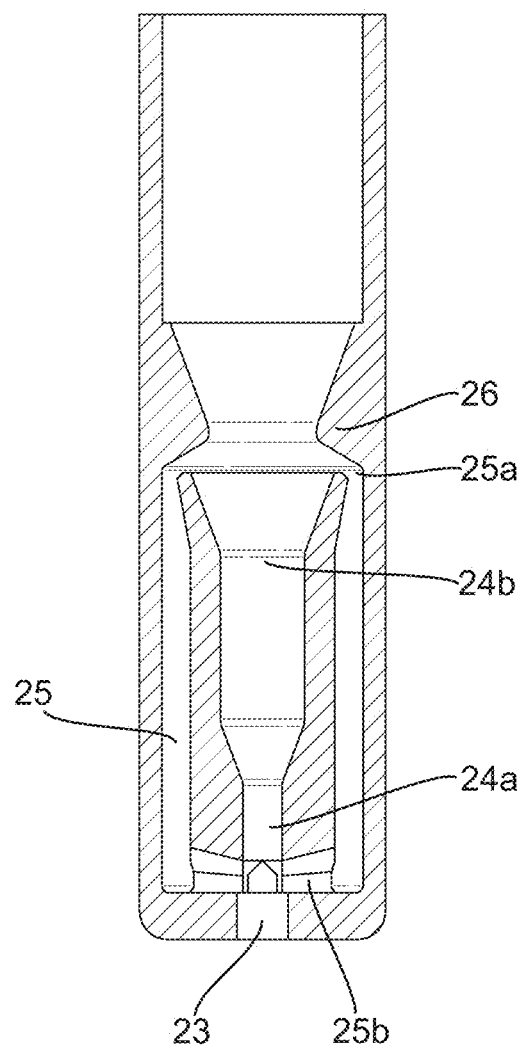
FIG. 7 shows schematically a cross-sectional view of a nebuliser assembly in accordance with various embodiments.

For example, as shown in FIGS. 6 and 7, the funnel part 24*b* of the first channel 24 may comprise plural (such as two, three, four or more) sections in which the cross-sectional area (diameter) of the channel continuously decreases, and one or more sections in which the cross-sectional area (diameter) of the channel is constant. This tiered configuration may facilitate more straightforward installation of the liquid capillary 10 in the nebuliser outlet 20 (as described above).

This tiered configuration may also allow an inner wall of the first channel 24 to act as a stop for the liquid capillary 10, for example to ensure that the liquid capillary outlet 12 is positioned at a desired distance (protruding from or withdraw within) the outlet aperture 23 when the liquid capillary 10 is installed in the outlet 20.

Figure 8:
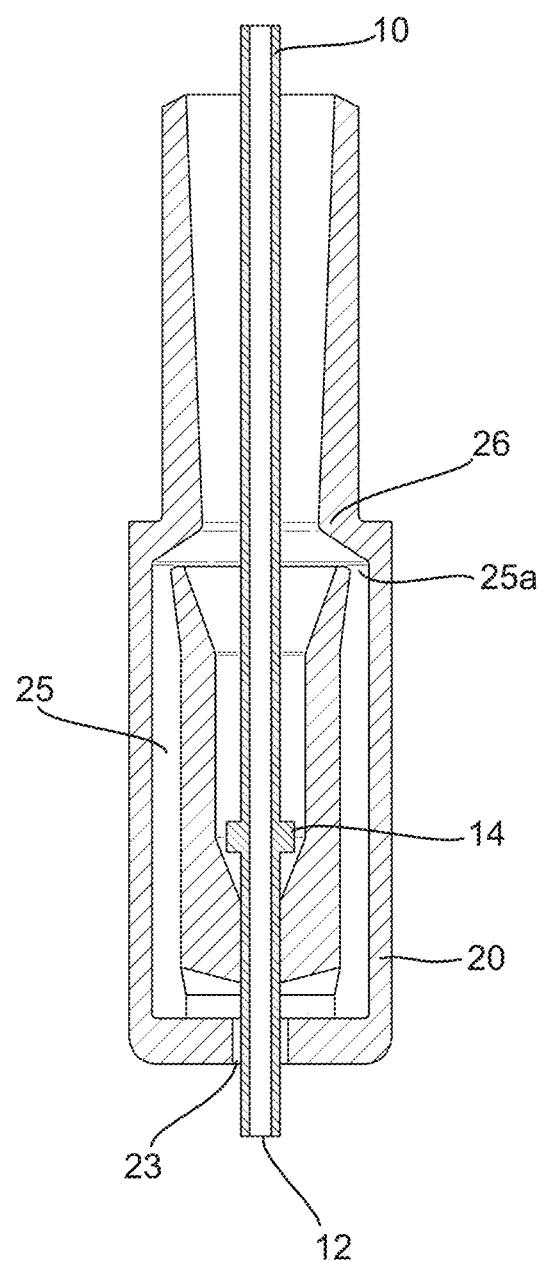
FIG. 8 shows schematically a cross-sectional view of an Electrospray Ionisation (ESI) ion source nebuliser in accordance with various embodiments.

For example, as shown in FIG. 8, a stop 14 may be provided on the liquid capillary 10. The stop 14 may be attached to the liquid capillary 10 at a selected distance relative to the liquid capillary outlet 12. The stop 14 (and the first channel 24) may be configured such that, when the liquid capillary 10 is installed in the outlet 20, the stop 14 interferes with an inner wall of the channel 24, such that the stop 14 (and the liquid capillary 10) cannot be moved beyond a certain (axial) position relative to the nebuliser outlet 20. This may be such that the outlet 12 of the liquid capillary 10 can be positioned at a desired distance (protruding from or withdraw within) relative to the outlet aperture 23 when the liquid capillary 10 is installed in the outlet 20.

As shown in FIG. 8, the stop 14 may have the form of a ring. However, the stop 14 may in general have any suitable shape, for example in the form of one or more protrusions. In embodiments, the stop 14 is configured to have a shape that corresponds to an inner wall of the first channel 24. The stop 14 may be configured to fill (to plug) the first channel 24 (at some point along its length). This may be such that when gas is provided to the outlet 20 (via the tube 30), the liquid capillary 10 is forced (by the gas pushing against the stop 14) into relatively precise (axial) alignment with the outlet 20 (such that the liquid capillary outlet 12 is positioned at a desired distance (protruding from or withdraw within) relative to the outlet aperture 23).

It should be noted that a stop 14 in the form of one or more protrusions may be used to control the position of a liquid capillary outlet 12 relative to a nebuliser outlet aperture 23 independently of the precise design of the nebuliser outlet 20. For example, a stop 14 in the form of one or more protrusions may be used to control the position of a liquid capillary outlet 12 relative to a nebuliser outlet aperture 23 of a nebuliser outlet 20 that has a single-piece constructions (for example as shown in FIGS. 4A and 4B) or that has a multi-part construction (for example as shown in FIGS. 3A and 3B).

Thus, in embodiments, a nebuliser may comprise a nebuliser outlet comprising an inlet end and an outlet end, an outlet aperture arranged at the outlet end, a first channel arranged between the inlet end and the outlet end, wherein the first channel is coaxially aligned with the outlet aperture, and one or more second channels arranged between the inlet end and the outlet end, wherein the one or more second channels are configured to pass gas from the inlet end to the outlet aperture. The nebuliser may comprise a liquid capillary comprising one or more protrusions, and the liquid capillary may be retained by the first channel.

These embodiments can include any one or more or each of the optional features described herein, as appropriate.

As also shown in FIGS. 6 to 8 the nebuliser outlet 20 may comprise one or more overhangs 26 (protrusions) arranged adjacent to an inlet or inlets 25*a* of the one or more second channels 25. The one or more overhangs 26 (protrusions) may extend radially inwardly, and may be positioned and configured to prevent snagging of the liquid capillary 10, for example so as to prevent snagging of the liquid capillary 10 in the inlet(s) 25*a* of the one or more second channels 25, when the liquid capillary 10 is installed in the nebuliser outlet 20. This may facilitate more straightforward installation of the liquid capillary 10 in the nebuliser outlet 20.

For example, as shown in FIGS. 6 to 8, in various embodiments, the one or more overhangs or protrusions 26 comprise a reduced cross sectional area (reduced inner diameter) portion in the first channel 24. The funnel part 24*b* of the first channel 24 may comprise two adjacent sections (a first section and a second section) in which the cross sectional area (diameter) of the channel continuously decreases. A cross sectional area (an inner diameter) of an outlet end of the first section may be less than a cross sectional area (an inner diameter) of an inlet end of the second section, so as to create an overhang 26 (protrusion). The inlet(s) 25*a* to the one or more second channels 25 may be arranged between the outlet end of the first section and the inlet end of the second section, so as to prevent snagging of the liquid capillary 10 in the inlet(s) 25*a* of the one or more second channels 25 when the liquid capillary 10 is installed in the nebuliser outlet 20.

As also shown in FIG. 6, an outlet end of the tube 30 may be configured to be surrounded by the inlet end 21 of the nebuliser outlet 20 when the nebuliser outlet 20 is attached to the tube 30, for example such that the nebuliser outlet 20 can be attached to the tube 30 in a gas tight manner, for example using an interference fit (or otherwise, as described above) between the outlet end of the tube 30 and the inlet end 21 of the nebuliser outlet 20.

In particular, as shown in FIG. 6, the tube 30 may comprise (at an outlet end of the tube 30) a recessed portion in its outer diameter which may be configured to be surrounded by an inner diameter of the inlet end 21 of the nebuliser outlet 20 when the nebuliser outlet 20 is attached to the tube 30, for example such that the nebuliser outlet 20 can be attached to the tube 30 in a gas tight manner, for example using an interference fit (or otherwise, as described above) between the recessed portion and the outer diameter of the inlet end 21. This may prevent snagging of the liquid capillary 10 when the liquid capillary 10 is installed in the nebuliser outlet 20.

The nebuliser outlet 20 may be formed using the additive manufacturing process by building the nebuliser outlet 20 beginning from the outlet end 22 and proceeding to the inlet end 21. This has been found to allow more mechanically robust construction of the nebuliser outlet 20 of FIGS. 6 and 7 using additive manufacturing. This also maximises the number of outlets 20 that can be simultaneously be manufactured, thereby increasing the efficiency of the manufacturing process.

However, in general the nebuliser outlet 20 of the various embodiments described herein may be formed using the additive manufacturing process in any orientation, such as for example by building the nebuliser outlet 20 beginning from the outlet end 22 and proceeding to the inlet end 21, by building the nebuliser outlet 20 beginning from the inlet end 21 and proceeding to the outlet end 22, or by building the nebuliser outlet 20 beginning from a side surface and proceeding to an opposite side surface.

The additive manufacturing process may be used to form a single nebuliser outlet 20 at a time, or to form multiple (identical or non-identical) nebuliser outlets at the same time.

Figure 9A:
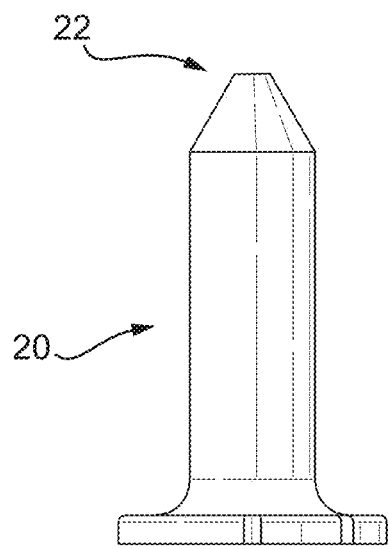
FIG. 9A shows schematically a side-on view of a nebuliser tip in accordance with various embodiments.
Figure 9B:
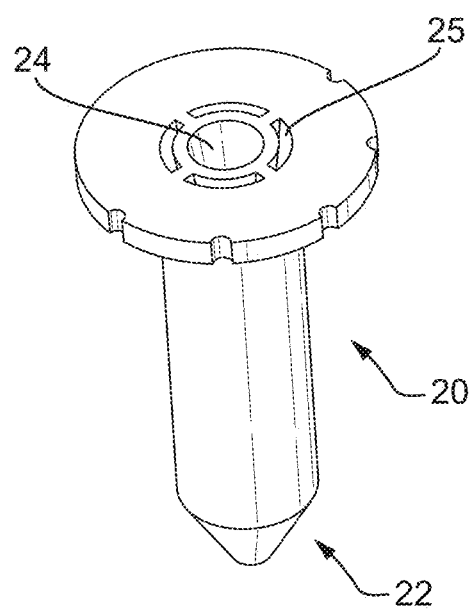
FIG. 9B shows schematically an end-on perspective view of a nebuliser tip in accordance with various embodiments.
Figure 9C:
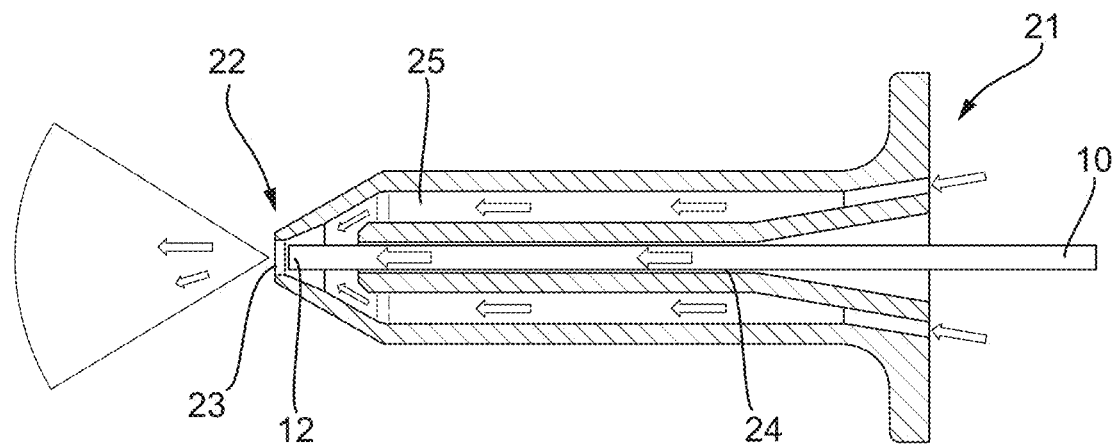
FIG. 9C shows schematically a cross-sectional view of a nebuliser tip in accordance with various embodiments.

FIGS. 9A-9C show schematically a nebuliser outlet 20 in accordance with various further embodiments. The nebuliser outlet 20 of FIGS. 9A and 9B is substantially similar to the nebuliser outlets 20 described above and shown in FIGS. 3A-8. The nebuliser outlet 20 may have any one or more or each of the optional features described herein, and may be configured substantially as described above.

As can be best seen in FIG. 9B, in these embodiments, the one or more second channels 25 comprises a segmented annular channel. Thus, the cross-sectional shape each of the one or more second channels 25 may (approximately) correspond to an annular sector (annulus sector). As shown in FIGS. 9B and 9C, the segmented annular channel 25 may coaxially surround the central first channel 24 for some or most of the length of the nebuliser outlet 20, but may converge with the first channel 24 at a convergence region close to the outlet aperture 23.

The cross-sectional shape of one or more or each of the one or more second channels 25 may be constant or may change along the length of the one or more second channels 25. Although FIG. 9B shows the annular channel 25 as being segmented into four channels, the annular channel 25 can be segmented into any suitable number of channels, such as two, three, four, five, etc. channels.

This arrangement has been found to provide robust mechanical stability, while improving reproducibility with respect to the manufacturing process. In particular, the material between each segment will provide additional mechanical support, while a segmented annular channel 25 is much less susceptible to being blocked by excess powder during the additive manufacturing (e.g. SLM) process, when compared with individual tubular channels.

The width of the segmented annular channels 25 may be selected so that the wall between the segmented annular channels 25 and the first channel 24 provides mechanical stability, while also allowing sufficient gas flow through nebuliser outlet 20 via the segmented annular channels 25.

As also illustrated in FIG. 9C, in various embodiments, the nebuliser outlet 20 may be configured such that, when the liquid capillary 10 is installed in the nebuliser outlet 20, the outlet (tip) 12 of the liquid capillary 10 does not protrude beyond the outlet aperture 23, but is instead arranged within the outlet 20 and withdrawn from the outlet aperture 23. This arrangement may produce so-called "flow blurring" nebulisation, i.e. where highly turbulent mixing between the liquid emitted from the capillary 10 and the nebulising gas flow creates a fine aerosol of extremely small droplets.

In these embodiments (and other embodiments described herein), the nebuliser may be configured such that the distance between the outlet 12 of the capillary 10 and the outlet aperture 23 is adjustable (controllable), e.g. so that the properties of the spray that depend on this distance can be controlled (in use). For example, the nebuliser may include a mechanical arrangement, such as the mechanical arrangement described in GB 2562168 (Micromass UK Ltd), the contents of which are incorporated herein by reference, which may be configured to allow the distance between the outlet 12 of the capillary 10 and the outlet aperture 23 to be adjusted. Other arrangements would, however, be possible.

Figure 10A:
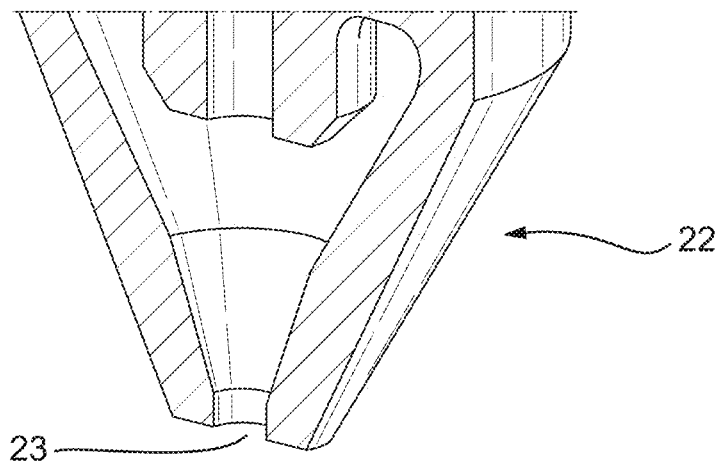
FIGS. 10A and 10B show close up cross-sectional views of the outlet end of a nebuliser tip in accordance with various embodiments.
Figure 10B:
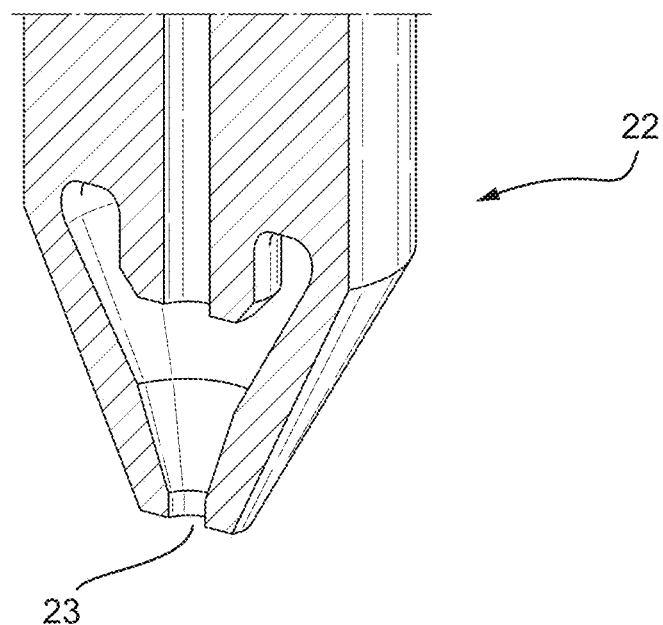

FIGS. 10A and 10B show close up cross-sectional views of the outlet end 22 of the nebuliser outlet 20 of FIGS. 9A and 9B. As described above, various parameters can affect the nature of the spray emitted by the nebuliser outlet 20.

Referring to FIG. 10A, one of these parameters is the size, e.g. diameter, of the outlet aperture 23. The Applicants have found that this parameter can be precisely controlled using the additive manufacturing process.

Furthermore, as illustrated by FIG. 10B, an internal cone angle within the (nebulisation region of the) nebuliser tip 20 can be precisely controlled using the additive manufacturing process. This angle can affect the properties of the spray emitted by the nebuliser outlet 20, particularly for arrangements in which the outlet end 12 of the capillary 10 is withdraw within the nebuliser tip 20 (i.e. where the nebulisation region is within the nebuliser outlet 20), such as "flow-blurring" nebulisation arrangements. This parameter would be challenging to control using conventional subtractive manufacturing processes.

It will be understood that various other parameters that affect the nature of the spray emitted by the nebuliser outlet 20 can be precisely controlled using the additive manufacturing process.

Figure 11A:
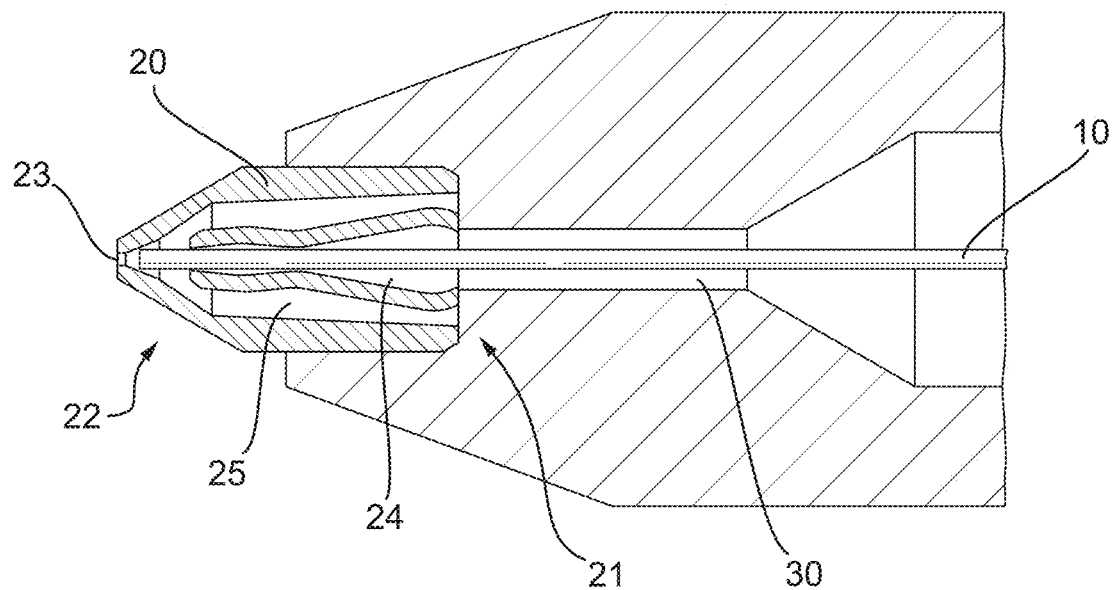
FIG. 11A shows schematically a cross-sectional view of a nebuliser in accordance with various embodiments.
Figure 11B:
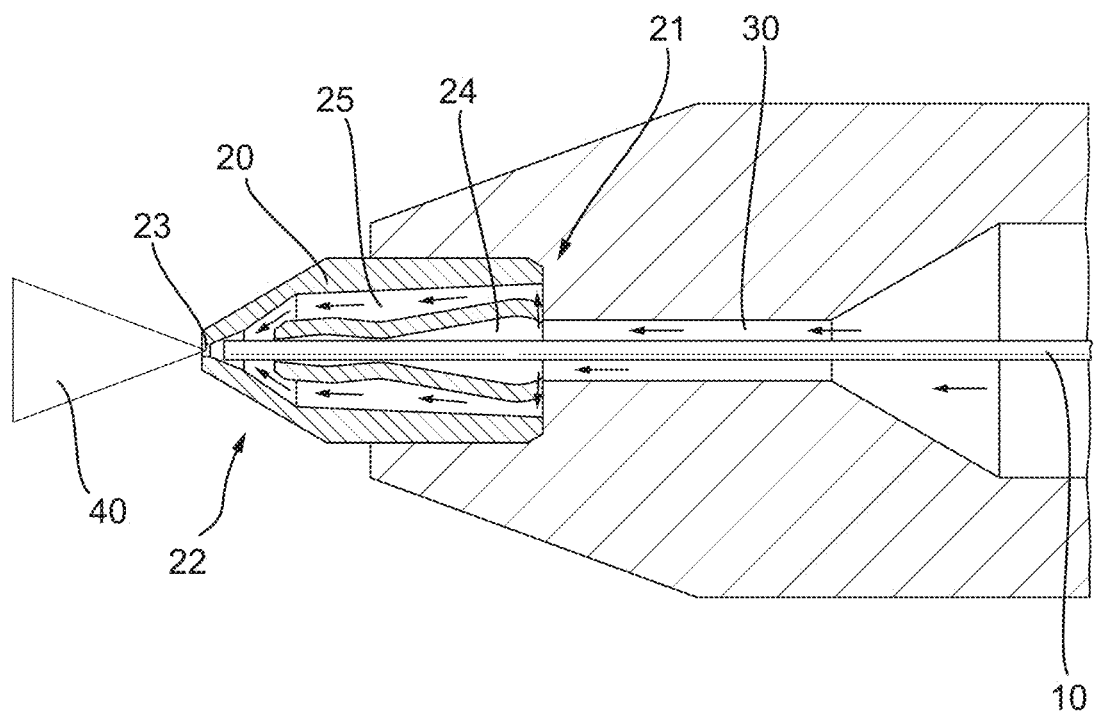
FIG. 11B shows schematically a cross-sectional view of a nebuliser in accordance with various embodiments.

FIGS. 11A and 11B show schematically a nebuliser assembly in accordance with various further embodiments. The nebuliser assembly and the nebuliser outlet 20 of FIGS. 11A and 11B is substantially similar to the nebuliser assemblies and outlets described above and shown in FIGS. 3A-10B. The nebuliser outlet 20 may have any one or more or each of the optional features described herein and may be configured substantially as described above.

As shown in FIGS. 11A and 11B, the nebuliser outlet 20 is an integrated, additive manufactured component, which can be installed in a nebuliser assembly. The nebuliser outlet 20 can be installed (e.g. welded) in a recess in an outlet region of the assembly, and the liquid capillary 10 can then be installed in the assembly, e.g. in the manner described elsewhere herein.

As shown in FIG. 11B, the nebuliser outlet 20 is configured to emit a spray of droplets 40 (generally in the axial direction) from its outlet end 22. To do this, the nebuliser outlet 20 is configured to receive at its inlet end 21 a flow of liquid, and a flow of gas. The nebuliser outlet 20 is configured to receive the flow of from a gas supply tube 30 within the nebuliser assembly and is configured to receive the flow of liquid via the liquid capillary 10 which passes through the gas supply tube. The nebuliser outlet 20 is configured to cause the liquid to be nebulised by the gas so as to produce the spray of droplets 40.

The outlet end 22 of the nebuliser outlet 20 comprises an outlet aperture 23, which is arranged on (coaxial with) the central axis of the nebuliser outlet 20. The nebuliser outlet 20 is configured such that, when the liquid capillary 10 is installed in the nebuliser outlet 20, the outlet (tip) 12 of the liquid capillary 10 does not protrude beyond the outlet aperture 23, but is instead arranged within the outlet 20 and withdrawn from the outlet aperture 23. This arrangement may produce flow blurring nebulisation.

In various embodiments, the outlet aperture 23 has a first (cross-sectional) area, which may be larger than, equal to or less than the (cross-sectional) area of the liquid capillary 10. The outlet aperture 23 may have a first (inner) diameter, which may be larger than, equal to or less than the outer diameter of the liquid capillary 10.

The nebuliser outlet 20 comprises a first (internal) channel 24 arranged between the inlet end 21 and the outlet end 22. The first channel 24 is arranged to extend along the central axis of the nebuliser outlet 20. The first channel 24 is configured to receive the liquid capillary 10 when the liquid capillary 10 is installed in the nebuliser outlet 20. The first channel 24 is coaxially aligned with the outlet aperture 23, such that when the liquid capillary 10 is installed in the nebuliser outlet 20, the liquid capillary 10 passes through the first channel 24.

As can be seen in FIGS. 11A and 11B, the first channel 24 has plural different cross-sectional areas (plural different inner diameters) along its (axial) length. In particular, the first channel 24 comprises a first part and a second funnel part.

The funnel part is arranged at the inlet end 21 of the nebuliser outlet 20, and is configured such that its cross-sectional area (its inner diameter) decreases from the inlet end 21 towards the outlet end 22, for example from around the cross sectional area (the inner diameter) of the gas supply tube 30 to around the cross sectional area (the diameter) of the liquid capillary 10. This can facilitate straightforward installation of the liquid capillary 10 in the nebuliser outlet 20.

The first part of the first channel 24 is arranged at the outlet end 22 of the nebuliser outlet 20, and is configured to retain the liquid capillary 10 (that is, to hold the liquid capillary in place, relative to the nebuliser outlet 20, at least in the radial direction). In particular, the first part of the first channel 24 is configured such that when the liquid capillary 10 is installed in the nebuliser outlet 20, the first part 24 retains the (outlet of the) liquid capillary 10 centrally to (in coaxial alignment with) the outlet aperture 23.

To do this, at least part of the first part has a second (cross-sectional area) that is approximately equal to or slightly larger than the (cross-sectional) area of the liquid capillary 10 (e.g. at least part of the first channel has a second (inner) diameter that is approximately equal to or slightly larger than the outer diameter of the liquid capillary 10). In particular, the first part of the first channel 24 may be configured to have two (or more) regions that have the second (cross-sectional area) (the second diameter) that is approximately equal to or slightly larger than the (cross-sectional) area (the outer diameter) of the liquid capillary 10. This may be such that the (outlet of the) liquid capillary 10 is retained relative to (centrally to and/or in coaxial alignment with) the outlet aperture 23 when the liquid capillary 10 is passed through the first channel 24 by an interference fit. The two or more regions may be separated by a distance (in the axial direction) which is large enough that the liquid capillary 10 is suitably constrained by the first part, and retained relative to (centrally to and/or in coaxial alignment with) the outlet aperture 23.

The nebuliser outlet 20 comprises one or more second (internal) channels 25 arranged between the inlet end 21 and the outlet end 22. Each of the one or more second channels 25 are arranged to run alongside the central axis of the nebuliser outlet 20, such as being (at least in part) parallel to the central axis of the nebuliser outlet 20 (and so parallel to the first channel 24).

The one or more second channels 25 are configured to pass gas from the inlet end 21 to the outlet aperture 23 (as indicated by the arrows in FIG. 11B). In other words, the one or more second channels 25 are configured such that gas received at the inlet end 21 is passed to the outlet aperture 23 via the one or more second channels 25 (and can bypass the first channel 24).

In particular, the one or more second channels 25 are configured such that when the liquid capillary 10 is installed in the nebuliser outlet 20, gas received at the inlet end 21 is passed to the outlet end 22 via the one or more second channels 25, and is emitted from the outlet aperture 23 so as to nebulise liquid emitted from the outlet of the liquid capillary 10.

An inlet end of each second channel 25 is arranged at or close to the inlet end 21 of the nebuliser outlet 20, and is configured to receive gas, for example, from the gas supply tube 30. An outlet end of each second channel 25 is arranged at or close to the outlet end 22 of the nebuliser outlet 20, and is in fluid communication with the outlet aperture 23, such that gas received at the inlet end of the channel is provided to and emitted from the outlet aperture 23.

FIG. 12 illustrates how the position of the liquid capillary 10 relative to the outlet aperture 20 can be adjusted. As shown in FIG. 12, the nebuliser may be configured such that the distance between the outlet 12 of the capillary 10 and the outlet aperture 23 is adjustable (controllable), e.g. so that the properties of the spray that depend on this distance can be controlled (in use). For example, the nebuliser may include a mechanical arrangement, such as the mechanical arrangement described in GB 2562168 (Micromass UK Ltd), which may be configured to allow the distance between the outlet 12 of the capillary 10 and the outlet aperture 23 to be adjusted. Other arrangements would, however, be possible.

Figure 13A:
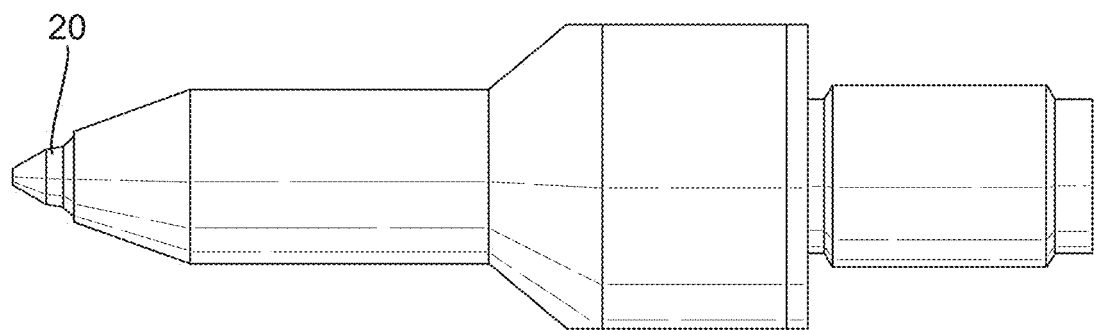
FIG. 13A shows schematically a side-on view of a nebuliser assembly in accordance with various embodiments.
Figure 13B:
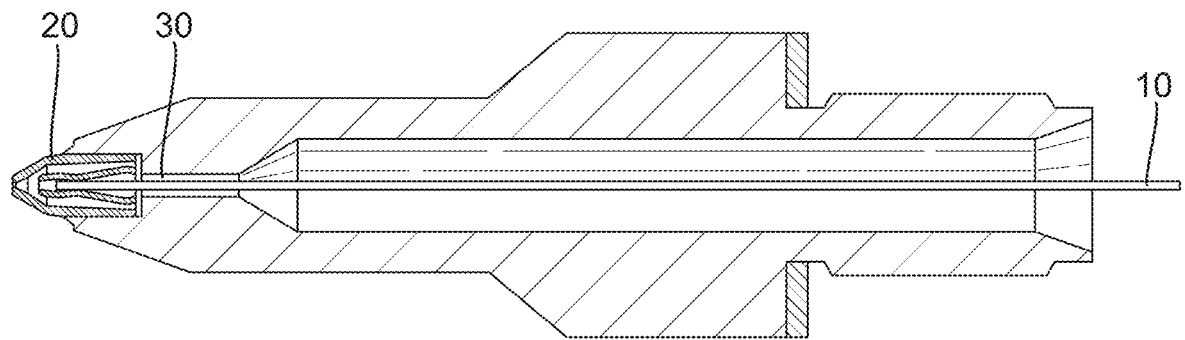
FIG. 13B shows schematically a cross-sectional view of a nebuliser assembly in accordance with various embodiments.

FIGS. 13A and 13B show the nebuliser outlet 20 of FIGS. 11A-11B when installed in the nebuliser assembly. As shown in FIGS. 13A and 13B, the nebuliser outlet 20 may be installed (e.g. welded) in a recess in an outlet region of the assembly, and the liquid capillary 10 may then be installed in the assembly, e.g. in the manner described elsewhere herein.

Figure 14A:
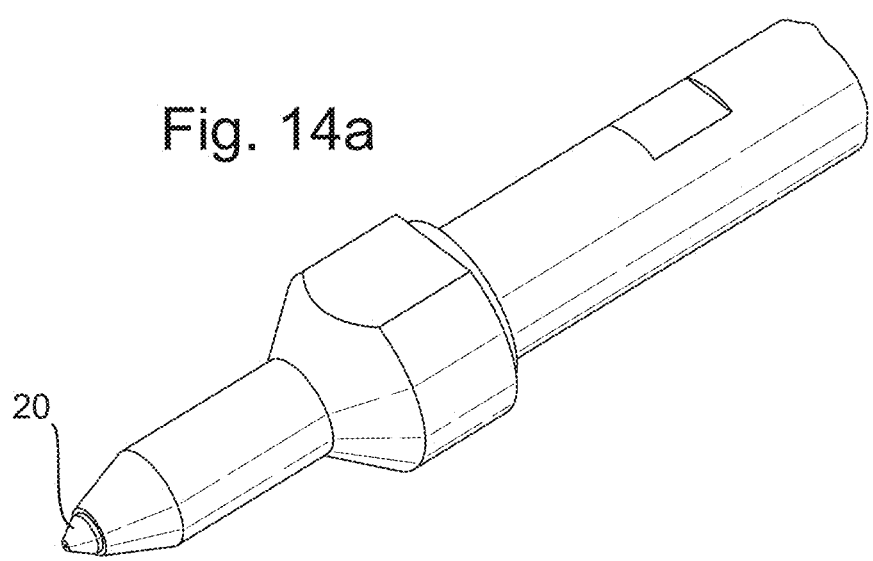
FIG. 14A shows schematically a perspective view of a nebuliser assembly in accordance with various embodiments.
Figure 14B:
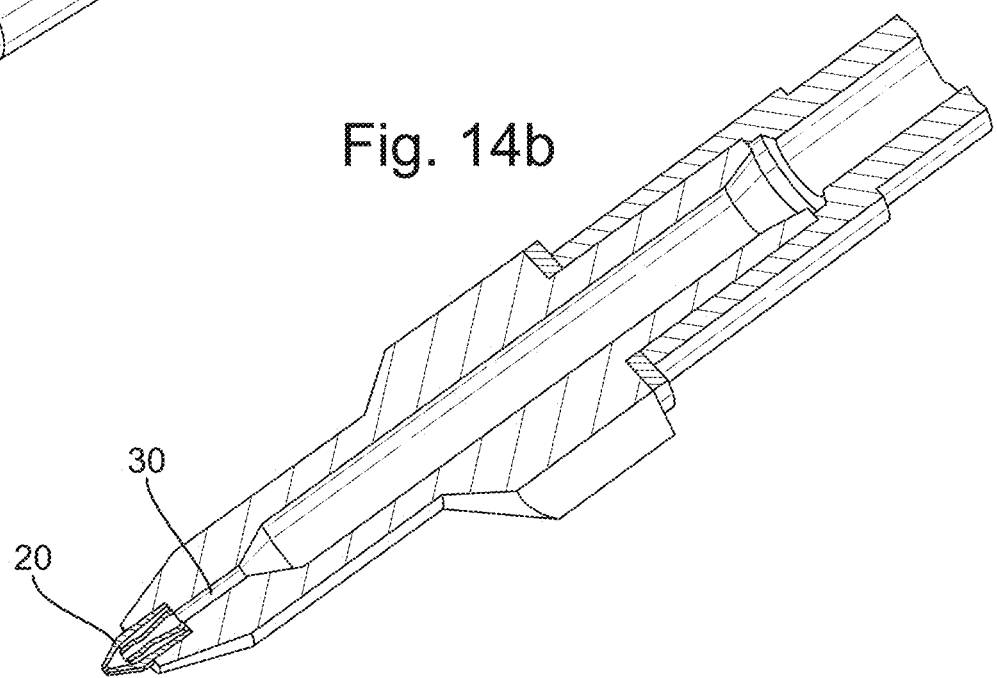
FIG. 14B shows schematically a cut-away perspective view of a nebuliser assembly in accordance with various embodiments.
Figure 14C:
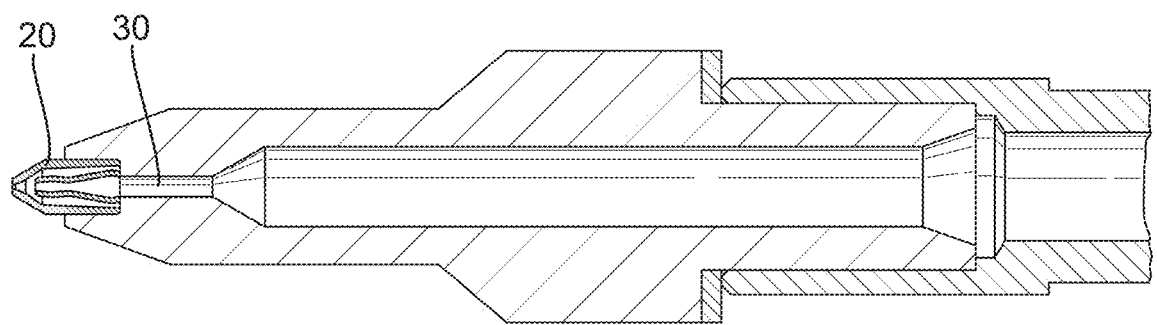
FIG. 14C shows schematically a cross-sectional view of a nebuliser assembly in accordance with various embodiments.

FIGS. 14A-14C again show the nebuliser outlet 20 of FIGS. 11A-11B when installed in a nebuliser assembly. As shown in FIGS. 14A-14C, the nebuliser outlet 20 is configured to receive the flow of gas from a gas supply tube 30 which is connected to the nebuliser outlet 20. The nebuliser assembly is configured such that, when the nebuliser outlet 20 is installed in the nebuliser assembly, the inlet end 21 of the nebuliser outlet 20 is in fluid communication with the tube 30, such that gas provided to an inlet of the tube 30 is provided to the inlet end 21 of the nebuliser outlet 20.

Figure 15A:
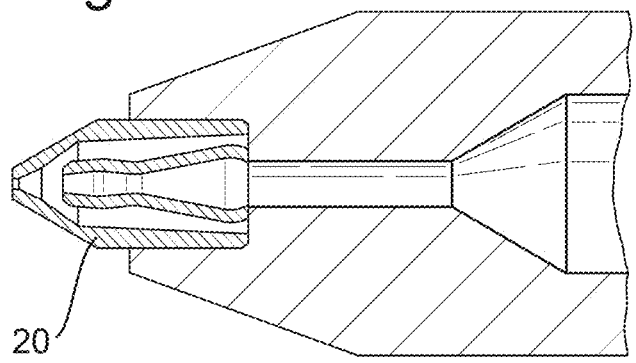
FIG. 15A shows schematically a cross-sectional view of a nebuliser assembly in accordance with various embodiments.
Figure 15B:
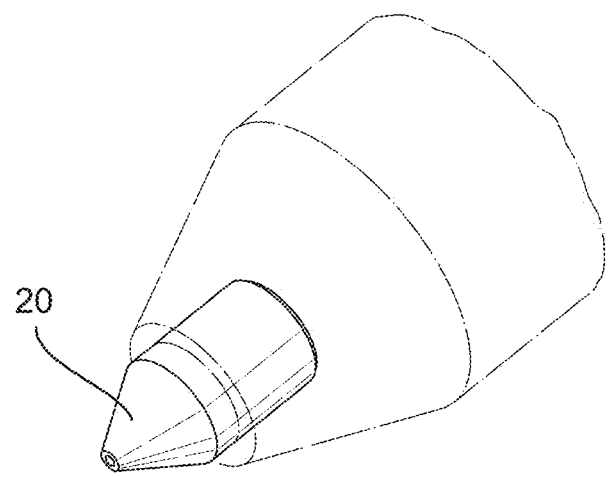
FIG. 15B shows schematically a perspective view of a nebuliser assembly in accordance with various embodiments.
Figure 15C:
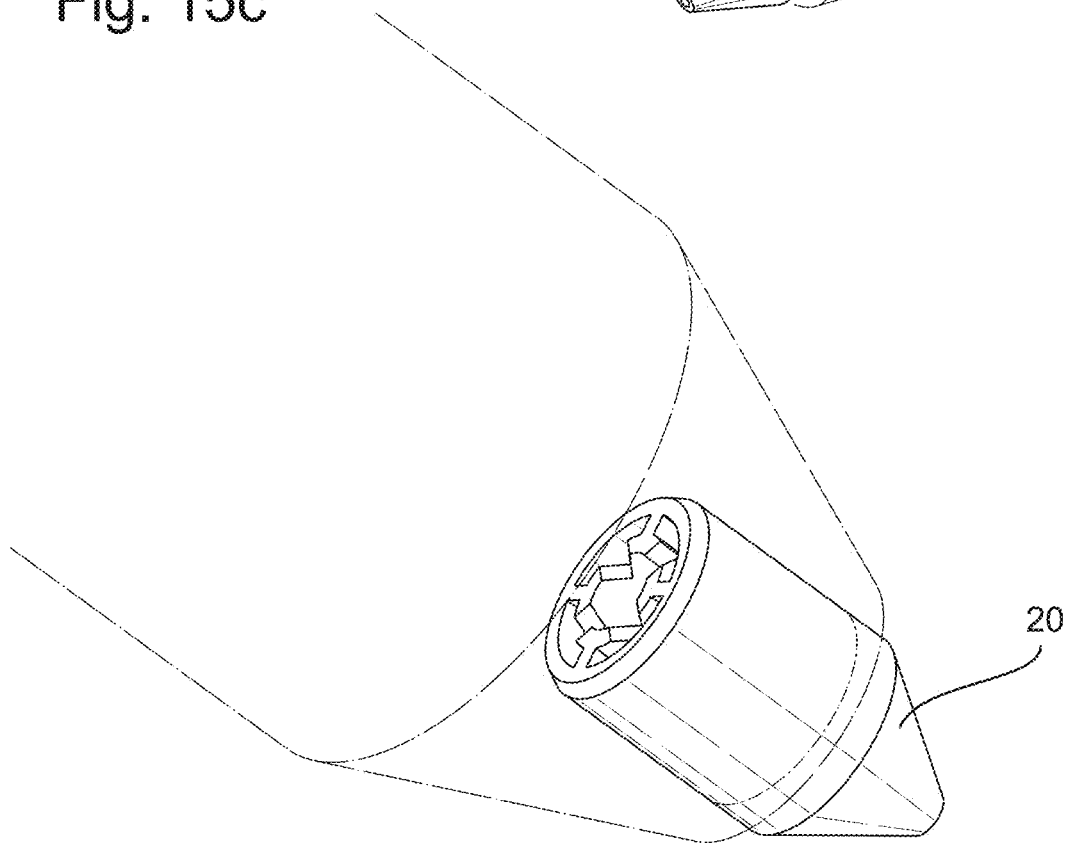
FIG. 15C shows schematically a perspective view of a nebuliser assembly in accordance with various embodiments.
Figure 16A:
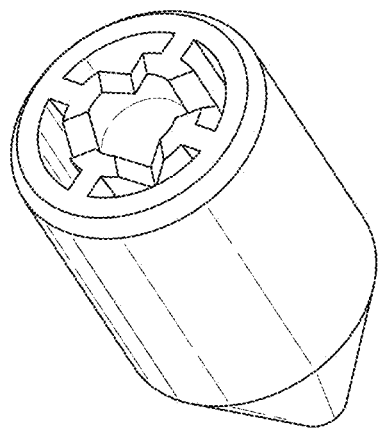
FIGS. 16A-16D show schematically perspective views of a nebuliser outlet in accordance with various embodiments.
Figure 16B:
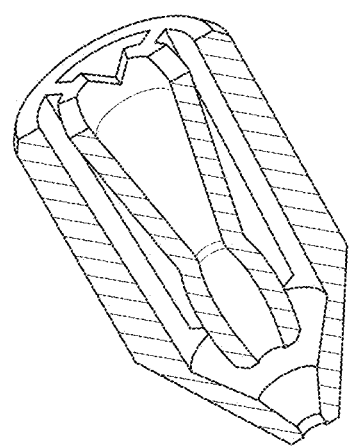
Figure 16C:
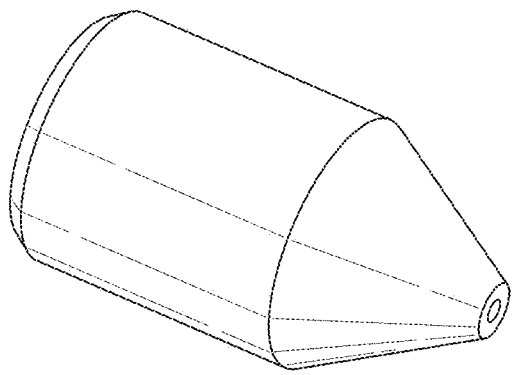
Figure 16D:
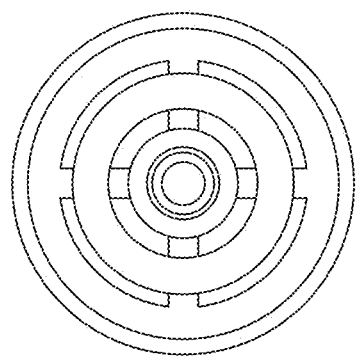

FIGS. 15A-15C show close-up views of the nebuliser outlet 20 of FIGS. 11A-11B when installed in a nebuliser assembly, and FIGS. 16A-16D show close-up views of the nebuliser outlet 20 of FIGS. 11A-11B by itself.

As can be seen in FIGS. 15A-16D, the one or more second channels 25 comprises a segmented annular channel, where the cross-sectional shape each of the one or more second channels 25 approximately corresponds to an annular sector (annulus sector). The segmented annular channel 25 may coaxially surround the central first channel 24 for some or most of the length of the nebuliser outlet 20 and may converge with the first channel 24 at a convergence region close to the outlet aperture 23. As shown in FIGS. 15A-16D, the annular channel 25 can be segmented into any four channels, but more generally can be segmented into any suitable number of channels, such as two, three, four, five, etc. channels.

FIGS. 17A-17E show a nebuliser outlet 20 configured in accordance with various further embodiments. The nebuliser assembly and the nebuliser outlet 20 of FIGS. 17A-17E is substantially similar to the nebuliser assemblies and outlets described above and shown in FIGS. 3A-16D. The nebuliser outlet 20 may have any one or more or each of the optional features described herein and may be configured substantially as described above.

As illustrated in FIGS. 17A-17E, the outlet end 22 of the nebuliser outlet 20 comprises an outlet aperture 23, which is arranged off axis from (non-coaxial with) the central axis of the nebuliser outlet 20, i.e. non-concentric with respect to the nebuliser outlet 20.

The nebuliser outlet 20 is configured such that, when the liquid capillary 10 is installed in the nebuliser outlet 20, the outlet (tip) 12 of the liquid capillary 10 protrudes beyond the outlet aperture 23. However, it would be possible for the outlet (tip) 12 of the liquid capillary 10 not to protrude beyond the outlet aperture 23, but to instead be arranged within the outlet 20 and withdrawn from the outlet aperture 23. In various embodiments, the outlet aperture 23 has a first (cross-sectional) area, which is larger than the (cross-sectional) area of the liquid capillary 10. The outlet aperture 23 may have a first (inner) diameter which is larger than the outer diameter of the liquid capillary 10.

The nebuliser outlet 20 comprises a first (internal) channel 24 arranged between the inlet end 21 and the outlet end 22. The first channel 24 is arranged off axis from (non-coaxial with) the central axis of the nebuliser outlet 20 (non-concentric with respect to the nebuliser outlet 20). The first channel 24 is configured to receive the liquid capillary 10 when the liquid capillary 10 is installed in the nebuliser outlet 20. The first channel 24 is configured such that when the liquid capillary 10 is installed in the nebuliser outlet 20, the liquid capillary 10 passes through the first channel 24 and protrudes beyond the outlet aperture 23.

Figure 17A:
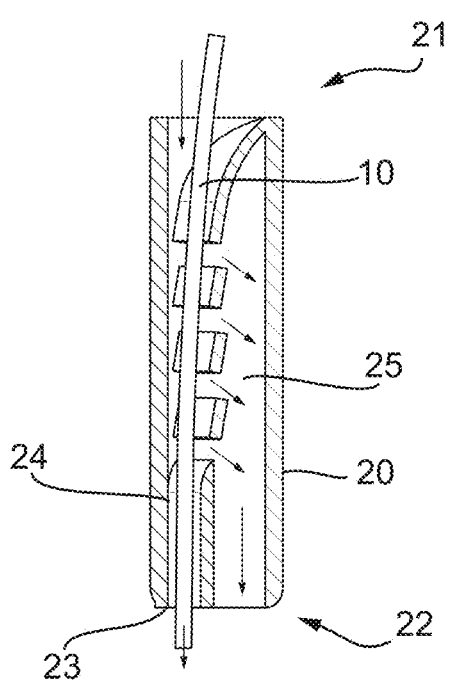
FIG. 17A shows schematically a cross-sectional view of a nebuliser assembly in accordance with various embodiments.
Figure 17B:
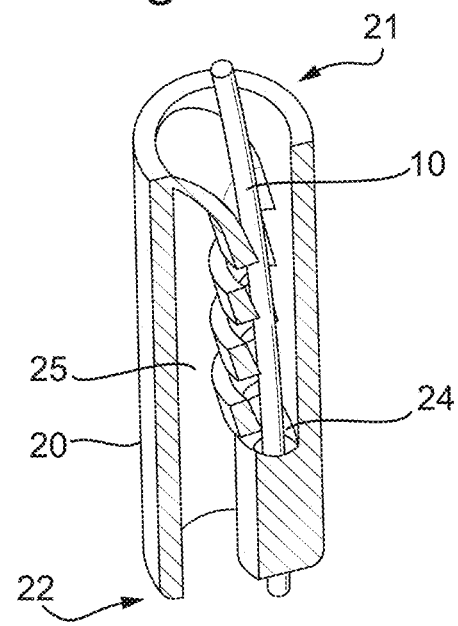
FIG. 17B shows schematically a cut-away perspective view of a nebuliser assembly in accordance with various embodiments.
Figure 17C:
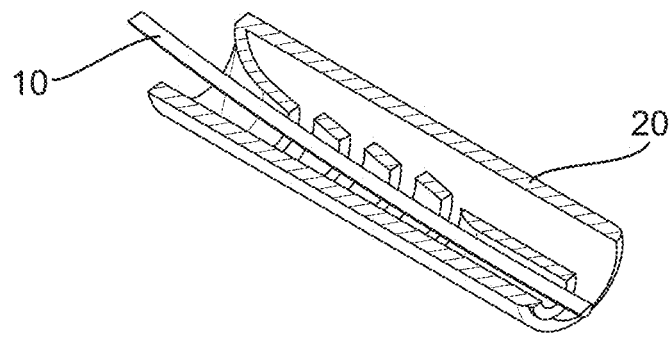
FIG. 17C shows schematically a cut-away perspective view of a nebuliser assembly in accordance with various embodiments.
Figure 17D:
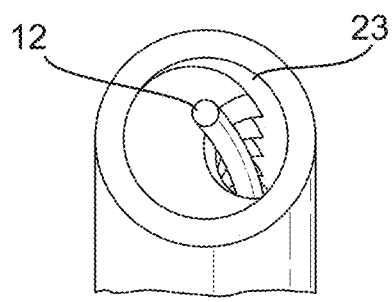
FIG. 17D shows schematically an end view of a nebuliser outlet in accordance with various embodiments.
Figure 17E:
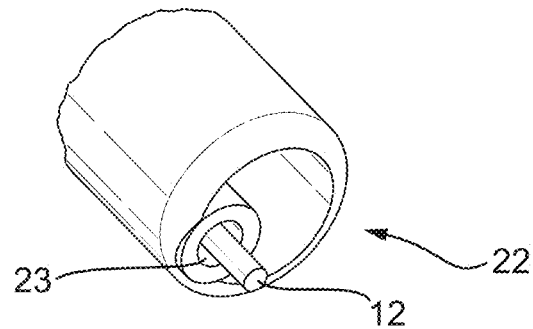
FIG. 17E shows schematically a perspective view of a nebuliser outlet in accordance with various embodiments.

As can be seen in FIGS. 17A and 17B, the first channel 24 may generally have a funnel shape, whereby its cross-sectional area (its inner diameter) decreases from the inlet end 21 towards the outlet end 22. This can facilitate straightforward installation of the liquid capillary 10 in the nebuliser outlet 20.

The first channel 24 is configured to retain the liquid capillary 10 (that is, to hold the liquid capillary in place, relative to the nebuliser outlet 20, at least in the radial direction). In particular, the first channel 24 is configured such that when the liquid capillary 10 is installed in the nebuliser outlet 20, the first channel 24 retains the (outlet of the) liquid capillary 10 centrally to (in alignment with) the outlet aperture 23.

The nebuliser outlet 20 comprises a second (internal) channel 25 arranged between the inlet end 21 and the outlet end 22. The second channel 25 is arranged to run alongside the first channel 24, for some or all of its length.

As can also be seen in FIGS. 17A and 17B, an internal wall which separates the first channel 24 from the second channel 25 may have one or more gaps therein, such that gas can pass from the first channel 24 to the second channel 25 (as indicated by the arrows in FIG. 17A). In particular some or all of the wall between the first channel 24 and the second channel 25 may comprise one or more louvres, where gas can pass from the first channel 24 to the second channel 25 through gaps between the louvres.

The second channel 25 is configured to pass gas to the outlet end 22 (as indicated by the arrows in FIG. 17A). In particular, the outlet 20 is configured such that when the liquid capillary 10 is installed in the nebuliser outlet 20, gas received at the inlet end 21 is passed to the outlet end 22 via the first 24 and second channels 25 (where the gas may pass from the first channel 24 to the second channel 25 via the one or more gaps), and is emitted from the outlet end 22 so as to nebulise liquid emitted from the outlet 12 of the liquid capillary 10.

Although various embodiments have been described above where incoming gas is received at the inlet end 21 of the nebuliser outlet 20, in various embodiments this need not be the case. In general, the nebuliser outlet 20 may have one or more gas inlets at the inlet end 21 or at any point along its length. For example, the nebuliser outlet 20 may have one or more gas inlets at a point between the inlet end 21 and the outlet end 22. Other arrangement would be possible.

It will be appreciated that various embodiments provide a single part (optionally coaxial) nebuliser tip 20 which facilitates reduced variation in performance from one use to the next (for example after uninstalling and re-installing a liquid capillary 10 and/or between repeat experimental runs), and from one nebuliser to the next.

The nebuliser tip 20 may be configured to position a fluid capillary 10 coaxially (or non-coaxially) to a gas flow to generate a consistent fine droplet spray with repeatable droplet size and distribution, where the capillary 10 may be held stably by a dedicated capillary hole 24 separate to the gas flow. Holding the capillary central to the gas flow is achieved by physical restraint of the capillary, and additional open passages 25 around those restraints are provided to allow the gas to flow and optionally to create an annulus at the capillary tip.

The nebuliser tip 20 is produced using additive manufacturing, such as Selective Laser Melting (SLM) or electron beam additive manufacturing. Traditional manufacturing techniques such as milling, turning and joining techniques would result in a multipart assembly. However, an unwanted effect of multiple part assemblies is the cumulative tolerances from the manufacturing and assembly processes. Micro Selective Laser Melting (SLM) is an additive manufacturing process which allows creation of sub millimetre sized components. This process has allowed the nebuliser assembly to be designed as a single part which eliminates the multi part tolerance build up.

Various embodiments provide a highly repeatable and optimised geometry using (e.g. SLM) additive manufacture.

The nebuliser may form part of an ion source, such as an Electrospray Ionisation (ESI) ion source. It would also be possible for the nebuliser to form part of another type of ion source that utilises a nebuliser, such as for example a Desorption Electrospray Ionisation (DESI) ion source, a Desorption Electro-Flow Focusing Ionisation (DEFFI), an impactor ion source, or an Atmospheric Pressure Chemical Ionisation (APCI) ion source.

The ion source may form part of or may be connectable to an analytical instrument, such as a mass and/or ion mobility spectrometer. Ions generated by the ion source may be analysed by the analytical instrument, e.g. so as to determine one or more physico-chemical properties of the ions, such as their mass, mass to charge ratio, ion mobility, etc.

The nebuliser is configured to emit a spray of droplets, such as a spray of nebulised droplets. To do this, the nebuliser is configured to receive a flow of liquid and a flow of gas, and to cause the liquid to be nebulised by the gas so as to produce the spray of droplets.

The flow of liquid may be a flow of solvent optionally containing analyte. The liquid may be provided to the nebuliser with a flow rate of, for example, (i)$\geq$100 µL/min; (ii)$\geq$200 µL/min; (iii)$\geq$300 µL/min; (iv)$\geq$400 µL/min; or (v)$\geq$500 µL/min. The flow of liquid may be, for example, an eluent from a liquid chromatography system. Thus, the nebuliser may be coupled to a liquid chromatography or other separation device. Alternatively, the flow of liquid may be from a (sample) reservoir.

The gas may be any suitable nebulising gas such as for example nitrogen. The gas may be provided to the nebuliser with a flow rate of, for example, (i)<100 L/hr; (ii) 100-150

L/hr; (iii) 150-200 L/hr; (iv) 200-250 L/hr; (v) 250-300 L/hr; (vi) 300-350 L/hr; (vii) 350-400 L/hr; or (viii)>400 L/hr.

In some embodiments, a voltage such as a high voltage may be applied to the nebuliser and/or liquid capillary, for example such that the spray of droplets emitted by the nebuliser comprises a spray of charged droplets, for example in the manner of an Electrospray Ionisation (ESI) ion source.

Although the present invention has been described with reference to preferred embodiments, it will be understood by those skilled in the art that various changes in form and detail may be made without departing from the scope of the invention as set forth in the accompanying claims.

The invention claimed is:

1. A nebuliser outlet comprising:

an inlet end and an outlet end; and a first channel and one or more second channels arranged between the inlet end and the outlet end;

a wall arranged between the first channel and the one or more second channels;

wherein the first channel is configured to receive a capillary;

wherein the nebuliser outlet is configured such that gas received by the nebuliser outlet can pass to the outlet end via the one or more second channels;

wherein the nebuliser outlet is a single integrated component; and wherein the wall is curved so as to provide the first channel with two regions that have a diameter configured for being approximately equal to the diameter of the capillary, for retaining the capillary radially and/or axially, and a greater diameter between the two regions.

2. The nebuliser outlet of claim 1, wherein the nebuliser outlet is formed using an additive manufacturing process.

3. The nebuliser outlet of claim 1, wherein the nebuliser outlet is formed using Selective Laser Melting (SLM) or electron-beam additive manufacturing.

4. The nebuliser outlet of claim 1, wherein the nebuliser outlet is configured such that when a capillary is received by the first channel, gas provided to the nebuliser outlet can pass via the one or more second channels to the outlet end, and can nebulise liquid emitted by the capillary.

5. The nebuliser outlet of claim 1, wherein the first channel and the one or more second channels converge at a convergence region within the nebuliser outlet; and wherein the nebuliser outlet is configured such that when a capillary is installed in the first channel, the outlet of the capillary is arranged within or downstream of the convergence region.

6. The nebuliser outlet of claim 1, wherein the nebuliser outlet comprises an outlet aperture arranged at the outlet end, and wherein the first channel is aligned with the outlet aperture; and wherein the nebuliser outlet is configured such that when a capillary is received by the first channel, the capillary is retained relative to the outlet aperture by the first channel.

7. The nebuliser outlet of claim 6, wherein:

the outlet aperture has a first cross sectional area;

at least part of the first channel has a second cross sectional area that is less than the first cross sectional area; and the nebuliser outlet is configured such that, when the capillary is installed in the nebuliser outlet, the outlet of the capillary is arranged downstream of the part of the first channel that has the second cross sectional area.

8. The nebuliser outlet of claim 1, wherein the first channel comprises a funnel part arranged at the inlet end.

9. The nebuliser outlet of claim 1, wherein the one or more second channels comprise an annular channel or a segmented annular channel.

10. The nebuliser outlet of claim 1, further comprising one or more overhangs or protrusions arranged adjacent to an inlet or inlets to the one or more second channels.

11. A nebuliser comprising:

the nebuliser outlet of claim 1; and said capillary;

wherein the capillary is retained by the first channel.

12. The nebuliser of claim 11, wherein the nebuliser is configured such that the liquid capillary is removable from the nebuliser outlet.

13. The nebuliser of claim 11, wherein the nebuliser is configured such that, when the liquid capillary is installed in the nebuliser outlet, the distance between an outlet end of the capillary and the outlet end of the nebuliser outlet is adjustable.

14. The nebuliser of claim 11, wherein the liquid capillary comprises one or more protrusions configured to interfere with an inner wall of the first channel.

15. An ion source comprising the nebuliser of claim 11.

16. The ion source of claim 15, further comprising a voltage source configured to apply a voltage to the liquid capillary.

17. The ion source of claim 15, wherein the ion source comprises an Electrospray Ionisation (ESI) ion source, a Desorption Electrospray Ionisation (DESI) ion source, a Desorption Electro-Flow Focusing Ionisation (DEFFI) ion source, an impactor ion source, or an Atmospheric Pressure Chemical Ionisation (APCI) ion source.

18. A method of nebulising a liquid, the method comprising providing the nebuliser of claim 11, supplying liquid to the capillary, and supplying gas to the one or more second channels so as to nebulise the liquid emitted by the capillary.

19. A nebuliser outlet as claimed in claim 1, wherein the first channel has longitudinally extending notches at the inlet end configured to allow gas received by the nebuliser outlet to pass radially outwards through the notches from the first channel to the one or more second channels.

* * * * *